United States Patent
Bora et al.

(10) Patent No.: US 10,630,820 B2
(45) Date of Patent: Apr. 21, 2020

(54) WIRELESS COMMUNICATION METHODS

(71) Applicant: iLumi Solutions, Inc., Plano, TX (US)

(72) Inventors: Swapnil Bora, Dallas, TX (US); Corey Egan, Dallas, TX (US); Qinghui Tang, Plano, TX (US)

(73) Assignee: ILUMI SOLUTIONS, INC., Dallas, TX (US)

( * ) Notice: Subject to any disclaimer, the term of this patent is extended or adjusted under 35 U.S.C. 154(b) by 142 days.

(21) Appl. No.: 15/204,901

(22) Filed: Jul. 7, 2016

(65) Prior Publication Data

US 2017/0013663 A1    Jan. 12, 2017

Related U.S. Application Data

(60) Provisional application No. 62/189,637, filed on Jul. 7, 2015.

(51) Int. Cl.
*H04W 72/04* (2009.01)
*H04L 29/14* (2006.01)
(Continued)

(52) U.S. Cl.
CPC ........... *H04L 69/40* (2013.01); *H04B 17/27* (2015.01); *H04B 17/318* (2015.01);
(Continued)

(58) Field of Classification Search
CPC .. H04L 69/40; H04W 52/245; H04W 52/383; H04W 24/02; H04W 52/283; H04W 52/367
See application file for complete search history.

(56) References Cited

U.S. PATENT DOCUMENTS

| 543,280 A | 7/1895 | Westinghouse, Jr. |
| 5,193,208 A | 3/1993 | Yokota et al. |

(Continued)

FOREIGN PATENT DOCUMENTS

| JP | 2003-241714 A | 8/2003 |
| JP | 2004-093761 A | 3/2004 |

(Continued)

OTHER PUBLICATIONS

European Patent Office, Supplementary European Search Report for Appl. No. EP 12774216, dated Sep. 9, 2015, 5 pp.

(Continued)

*Primary Examiner* — Brandon M Renner
(74) *Attorney, Agent, or Firm* — Daniel J. Chalker; Edwin S. Flores; Chalker Flores, LLP

(57) ABSTRACT

Various wireless communication methods are provided for controlling two or more wireless devices. In one embodiment, various processes optimize the wireless communication, especially when multiple devices are present in a system or a network. In another embodiment, various controlling devices are accommodated in a network of devices at different points in time. The speed at which the new controlling device comes into a range of the networked devices is improved with existing signatures of different wireless protocols or devices present in the network. In another embodiment, a change in the signal strength of a wireless device can be used to detect an object or person, such as an intruder.

6 Claims, 20 Drawing Sheets

(51) Int. Cl.
*H04W 52/24* (2009.01)
*H04W 4/06* (2009.01)
*H04L 29/06* (2006.01)
*H04W 52/38* (2009.01)
*H04B 17/27* (2015.01)
*H04L 29/08* (2006.01)
*H04B 17/318* (2015.01)
*H04W 12/10* (2009.01)
*H04W 12/08* (2009.01)
*H04W 40/20* (2009.01)
*H04W 24/02* (2009.01)
*H04W 84/20* (2009.01)
*H04W 52/36* (2009.01)
*H04W 52/28* (2009.01)
*H04W 76/14* (2018.01)
*H04W 88/04* (2009.01)

(52) U.S. Cl.
CPC ............ *H04L 67/125* (2013.01); *H04L 69/18* (2013.01); *H04W 4/06* (2013.01); *H04W 12/08* (2013.01); *H04W 12/1008* (2019.01); *H04W 52/245* (2013.01); *H04W 52/383* (2013.01); *H04W 24/02* (2013.01); *H04W 40/20* (2013.01); *H04W 52/283* (2013.01); *H04W 52/367* (2013.01); *H04W 76/14* (2018.02); *H04W 84/20* (2013.01); *H04W 88/04* (2013.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/22* (2018.01); *Y02D 70/38* (2018.01)

(56) References Cited

U.S. PATENT DOCUMENTS

| | | | |
|---|---|---|---|
| 6,016,038 A | 1/2000 | Mueller et al. |
| 6,028,871 A | 2/2000 | Vaughan et al. |
| 6,069,465 A | 5/2000 | De Boois et al. |
| 6,150,774 A | 11/2000 | Mueller et al. |
| 6,166,496 A | 12/2000 | Lys et al. |
| 6,211,626 B1 | 4/2001 | Lys et al. |
| 6,292,901 B1 | 9/2001 | Lys et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,655,817 B2 | 12/2003 | Devlin et al. |
| 6,720,745 B2 | 4/2004 | Lys et al. |
| 6,746,139 B2 | 6/2004 | Sinzawa et al. |
| 6,777,891 B2 | 8/2004 | Lys et al. |
| 6,788,011 B2 | 9/2004 | Mueller et al. |
| 6,806,659 B1 | 10/2004 | Mueller et al. |
| 6,950,656 B1 | 9/2005 | Bahk et al. |
| 6,965,205 B2 | 11/2005 | Piepgras et al. |
| 6,967,448 B2 | 11/2005 | Morgan et al. |
| 7,014,336 B1 | 3/2006 | Ducharme et al. |
| 7,038,398 B1 | 5/2006 | Lys et al. |
| 7,038,399 B2 | 5/2006 | Lys et al. |
| 7,079,808 B2 | 7/2006 | Striemer |
| 7,113,541 B1 | 9/2006 | Lys et al. |
| 7,126,291 B2 | 10/2006 | Kruse et al. |
| 7,167,777 B2 | 1/2007 | Budike, Jr. |
| 7,186,003 B2 | 3/2007 | Dowling et al. |
| 7,202,613 B2 | 4/2007 | Morgan et al. |
| 7,228,190 B2 | 6/2007 | Dowling et al. |
| 7,231,060 B2 | 6/2007 | Dowling et al. |
| 7,303,300 B2 | 12/2007 | Dowling et al. |
| 7,308,296 B2 | 12/2007 | Rys et al. |
| 7,332,878 B1 | 2/2008 | Smith |
| 7,348,736 B2 | 3/2008 | Piepgras et al. |
| 7,348,949 B2 | 3/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,378,805 B2 | 5/2008 | Oh et al. |
| 7,384,150 B2 | 6/2008 | Prince |
| 7,385,359 B2 | 6/2008 | Dowling et al. |
| 7,401,934 B2 | 7/2008 | Hunt |
| 7,436,132 B1 | 10/2008 | Null |
| 7,462,103 B2 | 12/2008 | Mattice et al. |
| 7,462,997 B2 | 12/2008 | Mueller et al. |
| 7,471,051 B1 | 12/2008 | Wacknov et al. |
| 7,476,002 B2 | 1/2009 | Wolf et al. |
| 7,482,763 B2 | 1/2009 | Rodriguez et al. |
| 7,490,957 B2 | 2/2009 | Leong et al. |
| 7,508,141 B2 | 3/2009 | Wong |
| 7,511,695 B2 | 3/2009 | Furukawa et al. |
| 7,518,319 B2 | 4/2009 | Konno et al. |
| 7,550,931 B2 | 6/2009 | Lys et al. |
| 7,597,455 B2 | 10/2009 | Smith et al. |
| 7,612,843 B2 | 11/2009 | Chou |
| 7,619,538 B1 | 11/2009 | Zarian |
| 7,623,042 B2 | 11/2009 | Huizenga |
| 7,652,236 B2 | 1/2010 | Cortenraad et al. |
| 7,658,506 B2 | 2/2010 | Dowling |
| 7,659,674 B2 | 2/2010 | Mueller et al. |
| 7,675,238 B2 | 3/2010 | Cortenraad et al. |
| 7,701,078 B1 | 4/2010 | Johnson et al. |
| 7,712,914 B2 | 5/2010 | Levy et al. |
| 7,719,208 B2 | 5/2010 | Li et al. |
| 7,731,371 B2 | 6/2010 | Prince |
| 7,731,383 B2 | 6/2010 | Myer |
| 7,745,769 B2 | 6/2010 | Tracy et al. |
| 7,764,026 B2 | 7/2010 | Dowling et al. |
| 7,777,427 B2 | 8/2010 | Stalker, III |
| 7,777,430 B2 | 8/2010 | Catalano et al. |
| 7,781,713 B2 | 8/2010 | Papamichael et al. |
| 7,781,979 B2 | 8/2010 | Lys |
| 7,809,448 B2 | 10/2010 | Lys et al. |
| 7,812,297 B2 | 10/2010 | Blaut et al. |
| 7,818,029 B2 | 10/2010 | Sanguinetti |
| 7,845,823 B2 | 12/2010 | Mueller et al. |
| 7,856,152 B2 | 12/2010 | Diederiks et al. |
| 7,863,829 B2 | 1/2011 | Sayers et al. |
| 7,863,831 B2 | 1/2011 | Vos |
| 7,878,671 B2 | 2/2011 | Hunt |
| 7,893,633 B2 | 2/2011 | Pedersen |
| 7,914,172 B2 | 3/2011 | Nagara et al. |
| 7,919,937 B2 | 4/2011 | Tracy et al. |
| 7,920,053 B2 | 4/2011 | Pattok et al. |
| 7,926,975 B2 | 4/2011 | Siemiet et al. |
| 7,936,562 B2 | 5/2011 | Nagamura et al. |
| 7,936,904 B2 | 5/2011 | Furuasawa |
| 7,946,729 B2 | 5/2011 | Ivey et al. |
| 7,961,113 B2 | 6/2011 | Rabiner et al. |
| 7,972,022 B2 | 7/2011 | Pohlert et al. |
| 7,972,028 B2 | 7/2011 | Durand et al. |
| 7,976,196 B2 | 7/2011 | Ivey et al. |
| 7,990,080 B2 | 8/2011 | Chang et al. |
| 7,999,491 B2 | 8/2011 | Peng et al. |
| 8,004,211 B2 | 8/2011 | Van Erp |
| 8,008,871 B2 | 8/2011 | Wang et al. |
| 8,013,545 B2 | 9/2011 | Jonsson |
| 8,016,470 B2 | 9/2011 | Li et al. |
| 8,021,021 B2 | 9/2011 | Paolini |
| 8,025,417 B2 | 9/2011 | Pohlert et al. |
| 8,026,673 B2 | 9/2011 | Lys |
| 8,029,154 B2 | 10/2011 | Myer |
| 8,035,320 B2 | 10/2011 | Sibert |
| 8,035,609 B2 | 10/2011 | Kerr et al. |
| 8,049,434 B2 | 11/2011 | Crouse et al. |
| 8,049,437 B2 | 11/2011 | Chang et al. |
| 8,070,325 B2 | 12/2011 | Zampini et al. |
| 8,093,823 B1 | 1/2012 | Ivey et al. |
| 8,100,552 B2 | 1/2012 | Spero |
| 8,143,811 B2 | 3/2012 | Shloush et al. |
| 8,169,163 B2 | 5/2012 | Kang et al. |
| 8,203,260 B2 | 6/2012 | Li et al. |
| 8,299,716 B2 | 10/2012 | Melzner et al. |

(56) References Cited

U.S. PATENT DOCUMENTS

| | | | |
|---|---|---|---|
| 8,324,832 B2 | 12/2012 | Yan et al. | |
| 8,326,136 B1 | 12/2012 | Clark | |
| 8,344,659 B2 | 1/2013 | Shimomura et al. | |
| 8,362,707 B2 | 1/2013 | Draper et al. | |
| 8,378,588 B2 | 2/2013 | Kuo et al. | |
| 8,410,717 B2 | 4/2013 | Shteynberg et al. | |
| 8,421,376 B2 | 4/2013 | Jonsson | |
| 8,427,063 B2 | 4/2013 | Hulett | |
| 8,430,402 B2 | 4/2013 | Diehl et al. | |
| 8,441,210 B2 | 5/2013 | Shteynberg et al. | |
| 8,482,223 B2 | 7/2013 | Draper et al. | |
| 8,531,137 B2 | 9/2013 | Jonsson | |
| 8,581,521 B2 | 11/2013 | Welten et al. | |
| 8,638,045 B2 | 1/2014 | Kunst et al. | |
| 8,669,716 B2 | 3/2014 | Recker et al. | |
| 8,729,826 B2 | 5/2014 | Jonsson | |
| 8,742,694 B2 | 6/2014 | Bora et al. | |
| 8,764,242 B2 | 7/2014 | Recker et al. | |
| 8,770,771 B2 | 7/2014 | Preta et al. | |
| 8,845,116 B2 | 9/2014 | Kim et al. | |
| 8,890,435 B2 | 11/2014 | Bora et al. | |
| 8,896,218 B2 | 11/2014 | Bora et al. | |
| 8,896,232 B2 | 11/2014 | Bora et al. | |
| 8,921,751 B2 | 12/2014 | Vuerfuerth | |
| 8,922,126 B2 | 12/2014 | Bora et al. | |
| 8,981,646 B2 | 3/2015 | Kim | |
| 9,113,528 B2 | 8/2015 | Bora et al. | |
| 9,161,419 B2 | 10/2015 | Anderson et al. | |
| 9,204,523 B2 | 12/2015 | Reed et al. | |
| 9,252,595 B2 | 2/2016 | Recker et al. | |
| 9,295,144 B2 | 3/2016 | Bora et al. | |
| 9,386,659 B2 | 7/2016 | Sinai et al. | |
| 9,615,371 B1* | 4/2017 | de Barros Chapiewski | H04W 4/023 |
| 9,642,100 B2* | 5/2017 | Yamamoto | H04W 52/42 |
| 10,178,723 B2 | 1/2019 | Van De Ven | |
| 2002/0093492 A1 | 7/2002 | Baron | |
| 2004/0042234 A1 | 3/2004 | Otake | |
| 2005/0043907 A1 | 2/2005 | Eckel et al. | |
| 2005/0170788 A1* | 8/2005 | Tanaka | H03G 1/0088 455/73 |
| 2005/0204505 A1 | 9/2005 | Kashiwagi | |
| 2007/0004349 A1* | 1/2007 | Ranganathan | H03G 3/3042 455/127.1 |
| 2007/0075965 A1 | 4/2007 | Huppi et al. | |
| 2007/0133469 A1 | 6/2007 | Shin et al. | |
| 2009/0111499 A1* | 4/2009 | Bosch | H04W 52/325 455/522 |
| 2009/0129341 A1 | 5/2009 | Balasubramanian et al. | |
| 2009/0286534 A1 | 11/2009 | Garg et al. | |
| 2009/0291690 A1* | 11/2009 | Guvenc | H04W 16/10 455/444 |
| 2010/0001648 A1 | 1/2010 | De Clercq et al. | |
| 2010/0188197 A1 | 7/2010 | Ackley | |
| 2010/0237711 A1 | 9/2010 | Parsons | |
| 2010/0244709 A1 | 9/2010 | Steiner et al. | |
| 2010/0285807 A1 | 11/2010 | Miller-Smith | |
| 2011/0179853 A1 | 7/2011 | Fugiel et al. | |
| 2012/0003932 A1* | 1/2012 | Zhodzishsky | H04W 52/0229 455/41.2 |
| 2012/0155317 A1 | 6/2012 | Shepard et al. | |
| 2012/0286676 A1 | 11/2012 | Saveri, III et al. | |
| 2013/0026947 A1 | 1/2013 | Economy et al. | |
| 2013/0247117 A1 | 9/2013 | Yamada et al. | |
| 2013/0315038 A1 | 11/2013 | Ferren et al. | |
| 2014/0001846 A1 | 1/2014 | Mosebrook et al. | |
| 2014/0021385 A1 | 1/2014 | Lynch | |
| 2014/0169795 A1 | 6/2014 | Clough | |
| 2014/0197960 A1 | 7/2014 | Taylor, Jr. et al. | |
| 2014/0206297 A1 | 7/2014 | Schlub et al. | |
| 2014/0239817 A1 | 8/2014 | Leinen et al. | |
| 2014/0325287 A1 | 10/2014 | Nair et al. | |
| 2014/0340630 A1 | 11/2014 | Pugh et al. | |
| 2015/0008831 A1* | 1/2015 | Carrigan | H05B 37/0227 315/153 |
| 2015/0116811 A1 | 4/2015 | Shrivastava et al. | |
| 2015/0120000 A1* | 4/2015 | Coffey | H04L 12/2803 700/13 |
| 2015/0189724 A1 | 7/2015 | Karc et al. | |
| 2015/0371534 A1 | 12/2015 | Dimberg et al. | |
| 2015/0373749 A1* | 12/2015 | Palin | H04W 76/10 455/41.2 |
| 2016/0131733 A1* | 5/2016 | Do | G01S 5/0226 342/378 |

FOREIGN PATENT DOCUMENTS

| | | |
|---|---|---|
| JP | 2005-233982 A | 9/2005 |
| KR | 10-0466042 B1 | 1/2005 |
| KR | 10-2008-0020608 A | 3/2008 |
| KR | 10-1184698 B1 | 9/2012 |
| WO | 2006/114725 A1 | 11/2006 |
| WO | 2012/145766 A2 | 10/2012 |
| WO | 2014027730 A1 | 2/2014 |
| WO | 2017007963 A1 | 1/2017 |
| WO | 2017007976 A1 | 1/2017 |

OTHER PUBLICATIONS

Philips Color Kinetics, "eColor Graze Powercore Product Guide," (2011), 12 pages.

Philips Color Kinetics, "ColorBurst Powercore Product Guide," (2010-2011), 24 pages.

Korea Patent Publication No. 10-2008-0009140—Abstract Only—Koninklijke Philips Electronics N.V., Jan. 24, 2008.

Korean Intellectual Property Office (ISA) International Search Report and Written Opinion for PCT/US2012/037369 dated dated Nov. 5, 2012, 10 pp.

Korean Intellectual Property Office (ISA) International Search Report and Written Opinion for PCT/US2016/041388 dated dated Oct. 18, 2016, 14 pp.

Korean Intellectual Property Office (ISA) International Search Report and Written Opinion for PCT/US2016/041408 dated dated Sep. 12, 2016, 17 pp.

European Patent Office, Partial European Search Report for Appl. No. EP 168219772, dated Nov. 14, 2018, 21 pp.

European Patent Office, Partial European Search Report for Appl. No. EP 16821999.6, dated Dec. 17, 2018, 23 pp.

European Patent Office, Partial European Search Report for Appl. No. EP 16821999.6, dated Feb. 11, 2019, 23 pp.

* cited by examiner

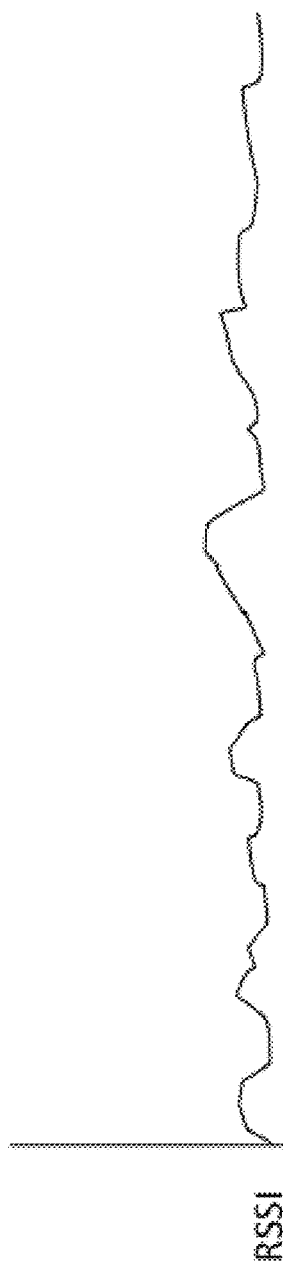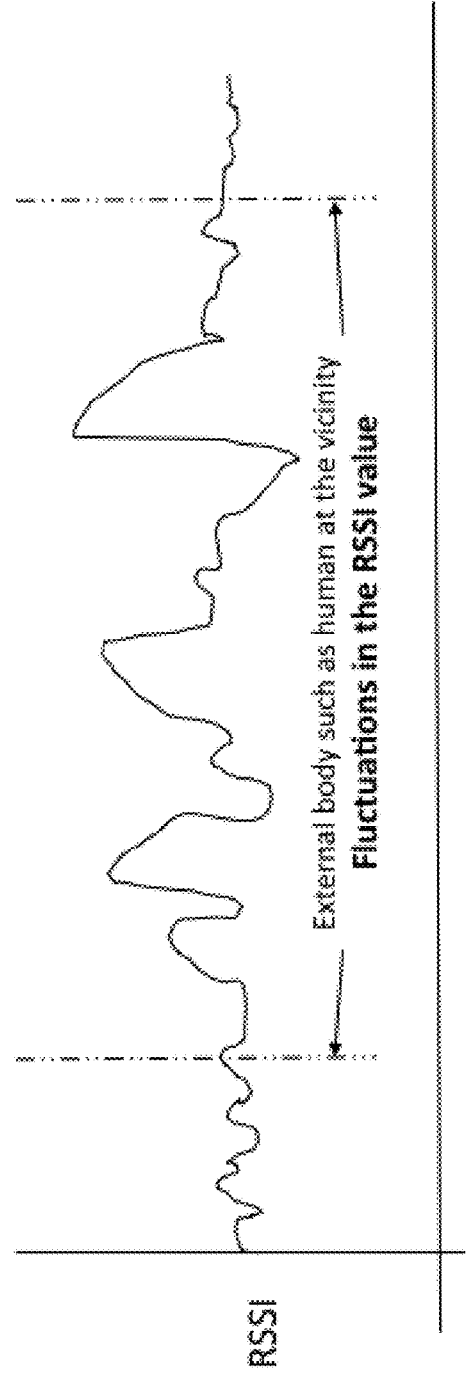

WIRELESS COMMUNICATION METHODS

CROSS-REFERENCE TO RELATED APPLICATIONS

This application claims priority to and is a non-provisional patent application of U.S. Provisional Patent Application Ser. No. 62/189,637, filed on Jul. 7, 2015, and entitled "Wireless Lighting Control Methods". The foregoing application is hereby to incorporated by reference in its entirety.

This application is related to U.S. patent application Ser. No. 14/175,322, filed on Feb. 7, 2014, and entitled "Wireless Lighting Control Methods", which is a continuation patent application of U.S. patent application Ser. No. 14/077,200, filed on Nov. 11, 2013, and entitled "Wireless Lighting Control System", which is: (1) a non-provisional patent application of U.S. Provisional Patent Application Ser. No. 61/724,651, filed on Nov. 9, 2012, and entitled "Wireless Lighting Control System"; and (2) a continuation-in-part application of U.S. patent application Ser. No. 13/836,280, filed on Mar. 15, 2013, now U.S. Pat. No. 8,922,126 B2, and entitled "Wireless Lighting Control System", which (a) is a continuation application of U.S. patent application Ser. No. 13/417,322, filed Mar. 11, 2012, now U.S. Pat. No. 8,890,435 B2, and entitled "Wireless Lighting Control System", which is a non-provisional patent application of U.S. Provisional Application Ser. No. 61/464,917, filed Mar. 11, 2011, and entitled "Specialty Lighting and Control Therefore", and (b) claimed priority to PCT Patent Application Serial Number PCT/US2012/037369, filed May 10, 2012, and entitled "Wireless Lighting Control System." The foregoing applications are hereby incorporated by reference in their entirety.

This application is also related to: (1) U.S. patent application Ser. No. 13/837,232, filed on Mar. 15, 2013, now U.S. Pat. No. 8,742,694 B2, and entitled "Wireless Lighting Control System"; (2) U.S. patent application Ser. No. 13/838,648, filed on Mar. 15, 2013, now U.S. Pat. No. 8,896,232 B2, and entitled "Wireless Lighting Control System"; and (3) U.S. patent application Ser. No. 13/839,738, filed on Mar. 15, 2013, now U.S. Pat. No. 8,896,218 B2, and entitled "Wireless Lighting Control System". The foregoing applications are hereby incorporated by reference in their entirety.

FIELD OF THE INVENTION

The present invention relates generally to the field of wireless communications and, more particularly, to control processes for individual or simultaneous communication, automation, and programming of an individual or network of such wireless devices through a wireless interface.

BACKGROUND OF THE INVENTION

The Internet of Things, wireless automation of residential, commercial and industrial places is on the rise. So is the use and complexity of multiple wireless protocols. The optimized use of each communication protocol ensuring reliability and speed is necessary for better user experience.

Additionally, communications protocols such as Bluetooth, ZigBee, WiFi, RF, etc. are going through advancements to accommodate larger numbers of devices in a network, higher data packets communications, reliability and throughput. Interoperability is also necessary when different protocol devices are part of a network, which makes network installation more complex. Otherwise the devices must be confined to using the protocols supported by the existing gateways or hubs. The use of multiple protocols as well as multiple devices in a network also adds to signal interference, which needs to be minimized for reliable and faster communication. There is also a need to control and communicate with the devices directly though smartphone, tablets or computers, which mostly have limited wireless protocols such as Bluetooth and Wi-Fi installed. Each of these has different limitations, advantages and disadvantages. In addition, as the number of devices increase, the failure rate can also increase because of a device going into a non-response mode or other failure mode that requires resetting of the device, thus, a simple low cost method is required to accommodate that.

SUMMARY OF THE INVENTION

In one embodiment of the present invention, various processes optimize the wireless communication, especially when multiple devices are present in a system or a network. The processes include controlling the signal strength at various stages of network implementation and communication. For example, two or more wireless devices are controlled by providing the two or more wireless devices, a first controlling device communicably coupled to the two or more wireless devices via one or more first wireless network connections, and a second controlling device that is not communicably coupled to the two or more wireless devices via the wireless network. Each wireless device includes a controller/processor, a wireless transceiver circuit communicably coupled to the controller/processor and an antenna communicably coupled to the wireless transceiver circuit. A control access request is sent from the second controlling device to the first controlling device requesting control of at least one of the two or more wireless devices. The one or more first wireless connections between the first controlling device and the at least one of the two or more wireless devices are dropped whenever the control access request satisfies one or more parameters. One or more second wireless network connections between the second controlling device and the at least one of the two or more wireless devices are established, and thereafter the at least one of the two or more wireless devices are controlled using the second controlling device.

In addition, signal interference can be reduced between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is determined as measured by either or both of the wireless devices. A signal power of either or both of the wireless devices is reduced whenever the signal strength exceeds a threshold value.

Moreover, two or more wireless devices can be controlled by providing the two or more wireless devices, and a controlling device communicably coupled to the at least one of the two or more wireless devices via one or more wireless network connections. Each wireless device includes a controller/processor, a wireless transceiver circuit communicably coupled to the controller/processor and an antenna communicably coupled to the wireless transceiver circuit. A broadcast signal is periodically sent from each wireless device. A stop broadcast signal is sent from the controlling device to all of the two or more wireless devices except for one or more specified wireless devices. One or more communications between the controlling device and the specified wireless device are exchanged. A resume broadcast signal is sent from the controlling device to all of the two or more wireless devices after the one or more communications between the controlling device and the specified wireless device are completed.

In another embodiment of the present invention, various controlling devices are accommodated in a network of devices at different points in time. The speed at which the new controlling device comes into a range of the networked devices is improved with existing signatures of different wireless protocols or devices present in the network. For example, two or more wireless devices are controlled by providing the two or more wireless devices that communicate using a first protocol, and a controlling device that communicates using the first protocol and a second protocol. The controlling device has a stored second protocol device signature associated with a location proximate to the two or more wireless devices. Each wireless device includes a controller/processor, a wireless transceiver circuit communicably coupled to the controller/processor and an antenna communicably coupled to the wireless transceiver circuit. Any wireless routing devices or access devices that communicate using the second protocol and have a device signature that matches the stored second protocol device signature are detected. One or more network connections between the controlling device and the two or more wireless devices are established using the first protocol whenever the device signature of the detected wireless routing device or access device matches the stored second protocol device signature, and thereafter the two or more wireless devices are controlled using the controlling device.

In another embodiment of the present invention, a change in the signal strength of a wireless device can be used to detect an object or person, such as an intruder. For example, a movement or position of an object is detected between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is monitored as measured by the first wireless device, the second wireless device, or both. A signal strength fluctuation value for the signal strength is determined over a time period or a number of signal strength samples. A trigger for a defined action is generated whenever the signal strength fluctuation value exceeds a defined threshold.

These and other objects, advantages and features of this invention will be apparent from the following description taken with reference to the accompanying drawing, wherein is shown a preferred embodiment of the invention.

BRIEF DESCRIPTION OF THE DRAWINGS

The above and further advantages of the invention may be better understood by referring to the following description in conjunction with the accompanying drawings, in which:

FIG. 18 is a graph illustrating RSSI values at a particular time period and environmental condition in accordance with one embodiment of the present invention;

FIG. 19 is a graph illustrating RSSI values when an external body, such as a human, is in the vicinity in accordance with one embodiment of the present invention;

DETAILED DESCRIPTION OF THE INVENTION

Figure 1:
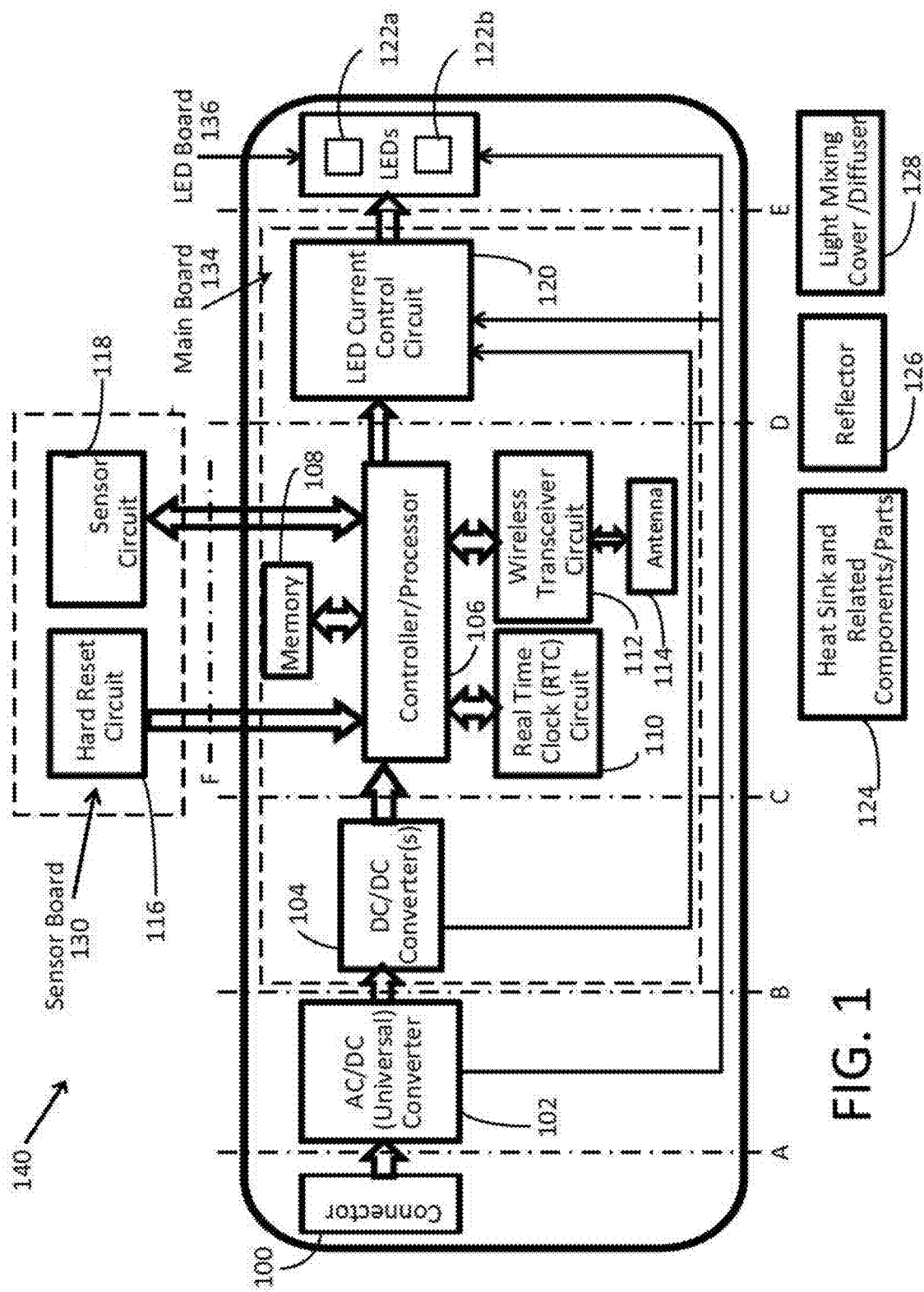
FIG. 1 is a block diagram of a lighting device in accordance with one embodiment of the present invention.

While the making and using of various embodiments of the present invention are discussed in detail below, it should be appreciated that the present invention provides many applicable inventive concepts that can be embodied in a wide variety of specific contexts. More specifically, the present invention provides control processes for individual or simultaneous communication, automation, and programming of an individual or network of such wireless devices through a wireless interface. The specific embodiments discussed herein are merely illustrative of specific ways to make and use the invention and do not delimit the scope of the invention. For example, FIGS. 1-4 describe wireless communications involving wireless enabled lighting devices; but as illustrated in FIGS. 5-22, the present invention is applicable to any kind of wireless enabled device.

With respect to FIGS. 1-4, the present invention provides an easily installed and transferable lighting and home automation solution because special or customized installation is not required. The present invention presents a solution to controlling, programming, and automating lighting devices, such that the color and brightness of any individual light or a group of lights can be manually or automatically controlled using a wireless interface. A user has the flexibility to personalize the color, atmosphere, and mood of a room to better fit ones preference, time of day, or occasion at hand. Additionally, since the present invention requires no installation, the solution is fully portable and can be removed and reused in other locations throughout the long life of the lighting device. Automation and dimming of the lighting devices save more energy than is consumed by the additional components of the lighting device. Moreover, using on/off signals having specified cycle times to produce a blended light reduce the current requirements of the lighting device.

In one embodiment of the present invention, a wireless lighting control system, consists of methods, apparatuses, and associated software (device application) for controlling, programming, and automating one and/or multiple 'Intelligent Illuminating Devices' (II Device) utilizing a wireless communication protocol executed between one or many wireless devices and one or many II Devices (II Device network). The methods and apparatuses presented here would allow one to adjust and control a single or network of II Devices with high flexibility, user control, and intuitive user interaction, with minimal installation or complexity.

For the purposes of discussing this invention the following terms will be used to describe the primary aspects of the invention. An II Device is a single wirelessly enabled lighting apparatus. A wireless device is a computing device such as a smartphone, computer, tablet, smartTV, remote, etc. A device application is a user facing software application run on the wireless device. A mesh network is a wireless communication protocol used to connect one or many II Devices and/or one or many wireless devices.

The light is a combination of a light generator, a light detector, a communicator, a power source, and a computer processor. In one embodiment these components are contained within one form factor similar to a standard light bulb. In other embodiments these elements will be separate from the other elements. For example, the light generator can be separate from the remaining components. In other embodiments, not all of the components are required. For example, one embodiment may consist solely of the lighting generator, communicator and computer processor. In other embodiments, an outside light-sensing component may be used. For example, an outside light-sensing component might be disparately connected to the remaining components.

An II Device in the context of this invention is a lighting apparatus containing additional electronic circuits and components. In one embodiment, the II Device will produce some measure or effect of luminosity dependent on commands sent wirelessly through a wireless device and associated device application. The II Device can receive wireless communications, take immediate action (in terms of a lighting output) based on the wireless communication, execute a sequence of actions, and store one or more commands to be executed at a specified time in the future or upon a specified condition being met. In addition, one embodiment of the II Device can intelligently relay/transmit wireless communication commands received from a device application (or II Device) to other II Devices within proximity. Similarly, one embodiment of the II Device would confirm receipt of the command through a wireless communication back to the wireless device and device application, possibly relaying the confirmation back through other II Devices. The communication means for to execute these processes can be seen in the mesh network section.

Now referring to FIG. 1, a block diagram of a lighting device in accordance with one embodiment of the present invention is shown. The lighting device (II Device) 140 might take numerous forms or embodiments in design, but certain components are common to the various designs while others will be used as is necessary for a specific embodiment. These components may or may not be part of II Device 140 and might be arranged in different fashion and with slight alteration to create different intelligent illuminating embodiments. For example, the II Device 140 includes a DC/DC power converter 104, a controller/processor 106 electrically connected to the DC/DC power converter 104, a light emitting diode (LED) current control circuit 120 communicably coupled to the controller/processor 106 and electrically connected to the DC/DC power converter 104, and two or more LEDs 122 electrically connected to the LED current control circuit 120. The LED current control circuit 120 can be a PWM driver, switching or multiplexer circuit, or light emitting diodes (LEDs) driver(s) circuit. The two or more LEDs 122 will include at least a first color LED 122a and a second color LED 122b. Moreover, at least one of the LEDs 122 may include a series of LEDs, a group of LEDs, an array of LEDs, two or more series-connected LEDs, two or more parallel-connected LEDs or a combination thereof. Typically, the first color LED 122a and the second color LED 122b will be selected from a red LED, a green LED, a blue LED, a red LED, a white LED, a tri-color LED and a four-color LED.

As will be explained in more detail below, a method for controlling one or more lighting devices 140 includes the steps of providing the one or more lighting devices 140, sending one or more control signals from the controller/processor 106 to the LED current control circuit 120 corresponding to a blended light having a specified color, and sending an on/off signal having a cycle time from the LED current control circuit 120 to each LED 122 in response to the one or more control signals such that the two or more LEDs 122 produce the blended light having the specified color based on how long each LED 122 is turned ON and/or OFF during the cycle time. The LED current control circuit 120 provides an on/off signal having a cycle time to each LED 122 in response to one or more control signals received from the controller/processor 106 such that the two or more LEDs 122 produce a blended light having a specified color based on how long each LED is turned ON and/or OFF during the cycle time. These on/off signals with specified cycle times to produce a blended light can be used to reduce the current requirements of the II Device 140.

Other embodiments will include additional components. For example, the additional components may include: a power supply connector/fastener 100; an AC/DC power converter 102 electrically connected to the power supply connector/fastener 100 and the DC/DC power converter 104; a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; a sensor circuit 118 communicably coupled to the controller/processor 106; a heat sink 124; a reflector 126 disposed behind or around the two or more LEDs 122; and/or a diffuser or lens 128 disposed above the two or more LEDs 122.

The components of the II Device 140 can be modularized to provide easy enhancement, customization, modification and repair of the II Device 140. For example, a main circuit board 134 may include the DC/DC power converter 104, the controller/processor 106, the LED current control circuit 120, the memory 108, the real time clock circuit 110, and the wireless transceiver circuit 112 and antenna 114. A sensor board 130 may include the hard reset circuit 116 and the sensor circuit 118. The sensor circuit 118 can be any desired sensor type, such as an ambient light sensor, a sound detector/microphone, etc. A LED board 136 may include the two or more LEDs 122 and additional LED related circuitry (e.g., LED arms).

The connector 100 performs at least one of two functions. One, it can physically connect the II Device 140 to a surface and two, it can provide access to a power source. The connector 100 could fasten to a standard surface, light socket, or electrical socket, or combination of the like. Similarly, the connector 100 could provide a connection to a power source as an Edison base (multiple sizes), Plug in, Bi-pin, or Battery connected connection (including water activated battery), etc. The connector 100 would conduct the electrical current through to the AC to DC converter 102. In some embodiments, such as the Intelligent Illuminating Strip (II Strip or Smartstrip), the fastener and power connection means of the connector 100 might be separated. For example, an electrical plug is connected via a wire to the rest of the Smartstrip and the Smartstrip is fastened in some other manner (such as screws or adhesive) to a surface. In other embodiments, such as the Intelligent Illuminating Bulb (II Bulb), the connector 100 would be an Edison base or bi-pin for which when the connector is inserted into the appropriate light socket, the connector 100 would provide appropriate contact to extend the AC or DC power source or supply into the body of the II Bulb. In addition, the connector 100 might provide some structural stability in fastening the II Device 140 to a surface.

The AC to DC converter 102 receives power from the connector 100 and outputs the appropriate DC power to the DC/DC converter 104, the LED current controlling 120 circuit, and LED circuit 122. Note that a single AC to DC converter 102 can be used in place of the combination of the AC to DC converter 102 and the DC/DC converter 104. The exact power input might vary depending on country specific standards or power sources, but as a universal converter, the power output will always be DC voltage such as 12VDC or 18VDC or 24VDC. Examples of power inputs include AC power 60V-290V/45-65 Hz or (Examples: 230VAC/50 Hz (European/Indian Standard), 110VAC/60 Hz (US Standard), or a range of DC power from 12VDC to 1000VDC. The AC to DC converter 102 might be housed within the connector 100 or separate from the connector 100, depending on the specific II Device embodiment.

The DC/DC converter(s) 104 receives a power input from the AC/DC converter 102, it then converts that power to DC power(s) required for driving the internal components/modules of the II Device 140. These components include the controller/processer 106, memory 108, the real time clock (RTC) circuit 110, the wireless transceiver circuit 112, antenna 114, and possibly components within the LED current control circuit 120. It might also supply power to other components, such as the hard reset circuit 116, the sensor circuit 118, and other potential added circuits. There might be multiple converters dependent on the output DC voltages required by different component requirements. Similarly, the power output would very dependent on the exact component requirements, for example the output might be 5VDC, 3.3VDC, or 1.3VDC.

The controller/processor 106 processes signals received from the memory 108, the real time clock (RTC) circuit 110, and the wireless transceiver circuit 112. It might also process signals from other components, such as the hard reset circuit 116, the sensor circuit 118, and other potential added circuits. It also takes action and sends commands to the memory 108, the real time clock (RTC) circuit 110, and the wireless transceiver circuit 112. It might also take action and send signals to other components, such as the sensor circuit 118 and other potential added circuits. In one embodiment, the computer processor includes a real time clock, processor 106, and memory chip.

The processor 106 processes the signals received by the various other components of the embodiment, computes necessary actions, and sends signals back out to various other components of the embodiment. The processor 106 will vary in terms of power, speed, and size in different embodiments. Additionally, the processor 106 is not limited to the contents listed above and may include other components.

The memory 108 stores data from factory defined settings and from user defined settings. The controller/processer 106 will read/write data in memory 108. Data might include factory-defined settings, such as communication protocols, identification and security protocols, and other data. Data might also include user-defined settings, such as user profiles, default commands, programs, and other data. The memory 108 could be inside the processor 106 and/or external to the processer 106 as a different integrated circuit or chip(s). The controller/processor 106 and memory 108 circuits might take a number of different technical specifications. In one embodiment, the processor 106 includes a real time clock, processor, and memory chip. The memory 108 receives information from the processor 106 and stores the commands for retrieval by the processor 106.

The real time clock circuit 110 includes a battery and a date and time clock based RTC. The controller/processor 106 will set the date and time data in the RTC 110 and also read the date and time data from the RTC 110. The RTC 110 could be internal to the controller/processor 106 or it could be an external circuit with respect to the controller/processor 106. The RTC 110 will run on the DC/DC power unless no power is provided, in which case it will run on the battery included within the real time clock circuit 106. The battery could be a rechargeable battery, in which case the DC/DC power when supplied would also charge the rechargeable battery through recharging circuitry. The battery could also be a non-chargeable battery. In one embodiment, the processor 106 includes a real time clock, processor, and memory chip. The real-time clock is battery powered and could be set for any time and date.

The wireless transceiver circuit 112 allows the II Device 140 to communicate with other wireless devices and/or other II Devices. The wireless transceiver circuit 112 includes a transmitter and receiver circuit based on established wireless protocols. These protocols could differ based on different II Device embodiments and changing wireless communication standards. Example wireless protocols include but are not limited to Bluetooth, ZigBee, Wi-Fi, and their related variants. The wireless transceiver circuit 112 will be connected to the controller/processor 106 and the antenna 114. In one embodiment, the wireless transceiver circuit 112 is composed of a transmitter and receiver circuit based on Bluetooth protocols. In other embodiments, the wireless transceiver circuit 112 might utilize other protocols including but not limited to ZigBee, WiFi, infrared, WiMax, LTE, ZWave, or other protocols not listed. In other embodiments, the wireless transceiver circuit 112 might include other component parts or circuitry.

The antenna 114 captures wireless communication signals and passes them to the wireless transceiver circuit 112 to decode those signals. The antenna 114 could take multiple forms depending on the protocol and signal frequency required. The physical location of the antenna 114 and/or wireless transceiver circuit 112 could be placed in multiple physical locations related to the II Device 140. For example, it might be placed outside of the II Device 140 or inside the II Device 140. Placing it outside, might increase the range of wireless communication for the II Device 140, especially when installed in locations with poor reception. Alternatively, the antenna might be built into the physical structure of the II Device 140 or be part of the main board 134 inside the II Device 140.

In some embodiments, the hard reset circuit 116 of the II Device 140 includes a button or switch mechanism and related circuitry. The button or switch would be connected to the controller/processor 106 either directly on the same board or through a wired connection. When the button or switch is activated, it will send a specific signal to the controller/processor 106 to execute the hard reset program for that II Device 140. The actual button or switch mechanism might be different dependent on the II Device 140 and its application. As example, the reset circuit might be a simple resistant button type switch, it might be a rotational type switch, or it might be a conductive type switch, it might be a compression switch based on pushing in some part of the mechanical structure. The location of the hard reset circuit might be co-located with other external components such as the sensor circuit(s), LEDs, diffuser housing, or other II Device components or structural parts. In this sense the physical location with respect to the II Device 140 might vary. The hard reset function in most embodiments will require access to the DC/DC power, and thus the II Device 140 would need to be connected to an active power source. In some embodiments though, the hard reset circuit 116 would have access to a separate power source such as a battery to provide the controller and related circuitry enough power to execute the hard reset command.

The sensor circuit 118 may include one or more sensors on any type and supporting circuitry, such as an ambient light sensor (photosensor or similar light detecting component), sound detector/microphone or combination thereof. In the case of an ambient light sensor circuit, the ambient light sensor(s) in the sensor circuit 118 detects a level of captured ambient light, converts that level into an analog signal, and sends that data to the controller/processor via an analog to digital (A/D) converter that could be a part of the sensor circuit 118 or controller/processor 106. The sensor circuit 118 would consist of one or more ambient light sensors per one or multiple II Devices. In some embodiments, the sensor circuit 118 could be embedded in the II Device 140 itself and in others it might be a separate peripheral device to the wireless lighting control system. Additionally, the placement of the sensor(s) 118 and related circuitry need not be exactly collocated, but possibly separated by a wire.

For example, the sensor(s) 118 could be placed in multiple locations in relation to the II Device 140: (a) placement of an ambient light sensor requires external light to reach the light sensor; (b) the sensor(s) could be placed on the exterior of the light, on the housing; (c) the sensor(s) could be at the end of an extension or wire protruding; or (d) the sensor(s) could be part of an external peripheral to the light, connected via wireless communication (e.g., the sensor could be housed with other electronic components such as a processor, communication source (Bluetooth module, Zigbee, Wi-Fi, or other)). There could also be multiple types of II Device sensors used: (a) one which senses a range of overall luminosity; (b) one that senses a combination of red, green and blue components or cyan, yellow, magenta or black components, or hue, saturation and lumens components of the light on it; or (c) in different scenarios the light measured could be in absolute or respective values. The ambient light sensor can be located to detect an ambient light and a light emitted by the II Device 140 such that the controller/processor 106 adjusts one or more of the on/off signals provided to the LEDs 122.

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The LED current control circuit 120 executes commands from the controller/processor 106 to control the current passed through the LEDs 122. The LED current control circuit 120 might take different forms dependent on the II Device embodiment as per the following schemes: solely LED drivers scheme, switches and LED driver scheme, multiplexer and LED driver scheme, and current limiting circuit scheme. In general, the controller/processor 106 sends commands to LED drivers, switches or multiplexer, which in turn controls the light output by controlling the average current passed through the LEDs 122. The average current would affect the overall luminosity of the II Device 140, such as that at lower average currents passed through the LED driver then the II Device would be dimmer.

For embodiments where multiple LED arms are present, unique to the presented schemes is a method to maximize the potential current passed through and subsequent luminosity of each LED arm with limited available current from the AC/DC converter 102. This is done by controlling the current passed through by the LED driver so that only one LED driver can pass through current at a time. This allows each on/off signal to provide a maximum current supplied by the DC/DC power converter to the LED 122. By varying and alternating very short lengths of time that current is passed through different LED arms using LED current control circuit 120, the schemes also allow the multiple LED arms to produce an overall blended light that is capable of various colors, saturation, and brightness. These schemes allow the II Device 140 to provide the highest level of individual luminosity emitted related to one of the LED arms, such as white, red, blue, or green, while also allowing for all combinations of color, brightness, and saturation to be achievable.

In other words, the specified color is produced by turning ON the first color LED 122*a* for a first portion of the cycle time and turning ON the second color LED 122*b* for a second portion of the cycle time. The two or more LEDs 122 are not turned ON at the same time. The cycle time is preferably short enough such that a user will not notice any flicker, which is usually around 85 Hz (about 12 ms), unless flicker is desired. The on/off signal for the first LED 122*a* includes two or more pulses during a portion of the cycle time that the first LED 122*a* is turned ON. Likewise, the on/off signal for the second LED 122*b* includes two or more pulses during a portion of the cycle time that the second LED 122*b* is turned ON. The on/off signals can be adjusted to provide a specified color, saturation and brightness or intensity. The specified brightness or intensity can be determined by a duty cycle of the on/off signals.

In one embodiment, the light generator is composed of LEDs, LED Drivers, and a light enhancement cover. The LEDs are of various types and colors. The LED Drivers are the circuitry that drives the LEDs. The LED Drivers take the commands from the processor for turning required LEDs at required brightness or intensity.

One potential scheme for the LED current control circuit 120 is the 'solely LED drivers scheme'. In this scheme the controller/processor 106 would send one or multiple Pulse Width Modulation (PWM) Signals to one or many LED drivers which would control the current flowing through an associated LED arm. There would be the same number of PWM signals sent as there would be LED drivers and LED arms. The total number of LEDs strings (arms) and LED drivers depend upon the application. LED driver circuit is designed for a particular current level to pass through it, so the LED driver circuit will regulate the flow of current through the respective LED arm to the set current level whenever the controller 106 provides a high level signal to it. PWM consists of high and low signals at a fixed frequency. One could change the duration of high and low signals in a given time frame (defined as time period=1/frequency). Considering the controller sends one PWM signal to one LED driver to control the average current through one associated LED arm. Varying the duty cycle of the PWM signal changes the average current flowing through the LED driver to the LED arm. The average current affects the overall luminosity of the II Device, such as lower average currents pass through the LED driver then the II Device would be dimmer (i.e., lowering the average currents passed through the LED driver dims the light produced by the II Device).

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The heat sink and related components and parts 124 may be required in some embodiments of the II Device 140. The heat sink and related components 124 dissipate the heat generated by the LEDs 122 and LED current control circuit 120. The heat sink 124 could take multiple sizes, shapes, and materials dependent on the II Device embodiment. 'Related components' refers to the housing and outer structure of the II Device 140. These materials and arrangement might of course differ depending on the particular II Device embodiment.

The light reflector 126 is used to amplify or focus the illumination generated by the LEDs 122. The light reflector 126 could be made of different reflective materials and come in different sizes, dependent on the specific variation and application of the II Device 140. The light reflector 126 would be placed behind and/or around the LEDs 122, most likely at an arc so that the illumination of the LEDs 122 is reflected, focused, and amplified through the diffuser 128. The exact placement, angle, and arc of the light reflector 126 would vary dependent on the variation and application of different II Devices.

The diffuser 128 is a part of the II Device 140 that spreads and/or 'mixes' the illumination produced by the LEDs 122. The diffuser 128 could be made of different materials and come in different sizes, dependent on the specific variation and application of the II Device 140. Common material might be glass, plastics, or fiber. The diffuser 128 would be placed over the LEDs 122 so that the illumination passes through the diffuser 128. The exact placement, angle, and arc of the diffuser 128 related to the LEDs 122 would vary dependent on the variation and application of different II Devices.

The II Device 140 might take other common embodiments not fully described in this disclosure, but not limited to the following: (a) an II Device integrated into a lighting fixture (e.g., could be installed fixture with all II Device circuitries built in or non-installed fixture such as a plug in lamp); (b) an II Device integrated into a fan (e.g., could be installed fixture with all II Device circuitries built in); (c) an II Device that is solely battery powered and affixed to a surface; (d) an II Device utilizing OLEDs as LEDs; (e) an II Device integrated into directly into surfaces (walls, tables, and ceilings), clothing, appliances, electronics (Displays, music equipment, etc.), musical instruments (pianos, guitars, etc.) and taking power from some source either internally or externally to that integrated part; or (f) an II Device specifically designed for emergency lighting. Considering the control of the II Device, the invention herein provides processes and methods to wirelessly control and/or program one or many II Devices through one or many wireless devices. These processes and methods shown and described provide maximum utility and range with a given communication protocol and a reliable and efficient system.

As previously mentioned, the II Device 140 could be modular (i.e., different parts of the II Device 140 as separated by a dashed-dot lines A, B, C, D, E and F could be detachable from a manufacturing or consumer standpoint). Certain parts or modules of the II Device 140 could be interchangeable with other types of the same module. As example, consider an II Device 140 that has different connector modules, plug in vs. Edison base, yet the rest of the modules are the same. The modules could be connected together through connectors, that a user could separate or place back together. The modules might also be structurally fixed together so that disassembly is required to disconnect the modules. Additionally, modules within the II Device 140 could be separated physically from each other yet connected electronically in some fashion. There could be different levels of modularity or no modularity at all, depending on the specific II Device embodiment.

Given the standard parts and connections of the II Device 140, there could be numerous potential II Device embodiments with differing arrangements, combinations, or expressions of the components disclosed.

Figure 2:
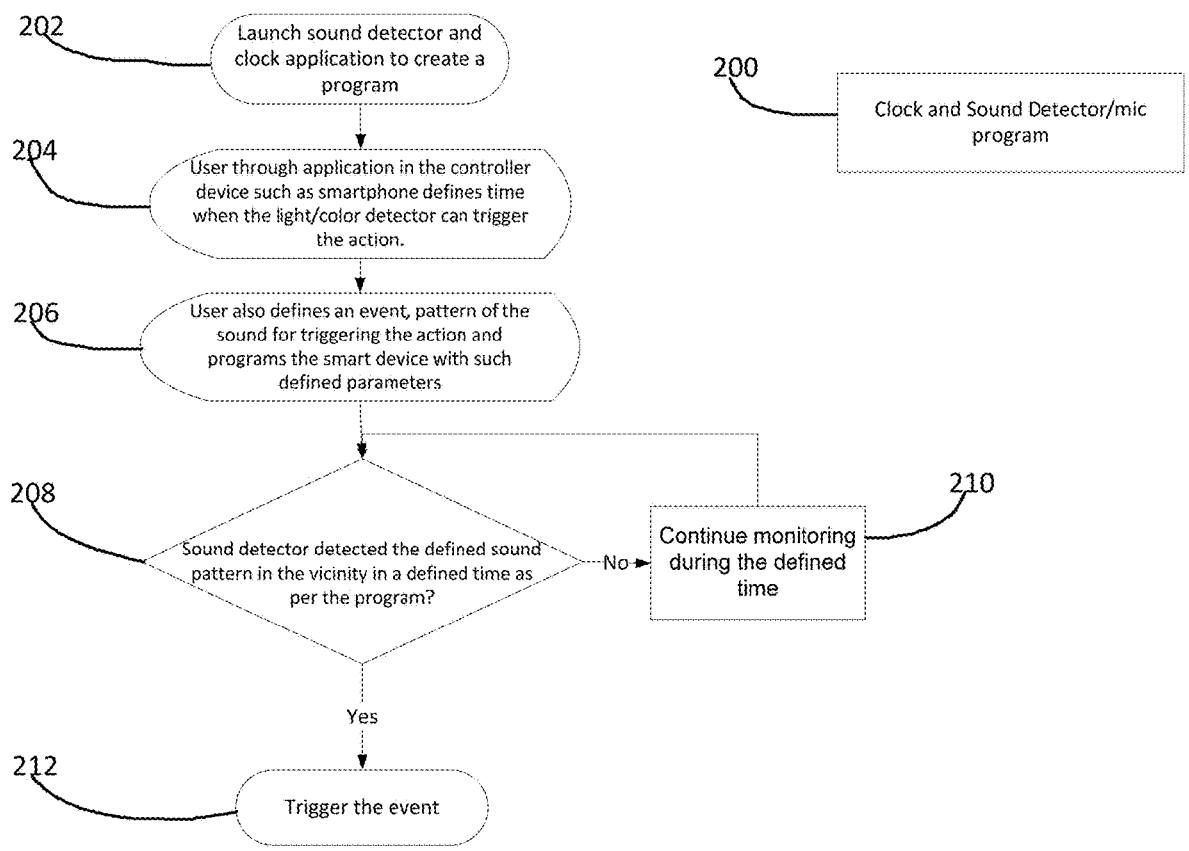
FIG. 2 is a flow chart of a sound detection process for a lighting device in accordance with one embodiment of the present invention.

Now referring also to FIG. 2, a flow chart of a sound detection process 200 for a lighting device in accordance with one embodiment of the present invention is shown. II Devices, such as smart bulbs with sensor circuits 118 containing a sound sensor/detector or microphone as well as Real Time Clock 110 or timer, can have specific applications where a user defines the time when the II Device should listen to particular defined sound and trigger an action based on that. For example, an application where a user wants to turn ON/OFF the lights between 10 pm and 8 am every weekday by clapping twice within 2 seconds can be achieved by implementing sound detector and real time clock inside the II Device that is communicably coupled to the processor. In such an II Device, the user can define a program of turning the sound detector functionality of the II Device ON between 10 pm and 8 am every weekday and then the II Device triggers the action of turning ON/OFF the bulb based on the clapping sound detected by the sound detector. An example of such a clock and sound detector/microphone process 200 begins when the sound detector and clock application are launched to create a program in block 202. The user defines a time when the sound detector can trigger the action using the application in the controller device, such as a smartphone, in block 204. The user defines an event or pattern of the sound for triggering the action and programs the smart device with such defined parameters in block 206. Note that the above process can be adapted to work with other sensors, such as light, color, motion or a combination thereof. When the program is running, the processor determines whether the sound detector has detected the defined sound pattern in the vicinity in the defined time in decision block 208. The defined parameters are not satisfied, as determined in decision block 208, the program continues to monitor sounds detected by the sound detector during the defined time in block 210 and loops back to decision block 208 whenever a sound is detected. If however, the defined parameters are satisfied, as determined in decision block 208, the program triggers the defined event in block 212.

Figure 3:
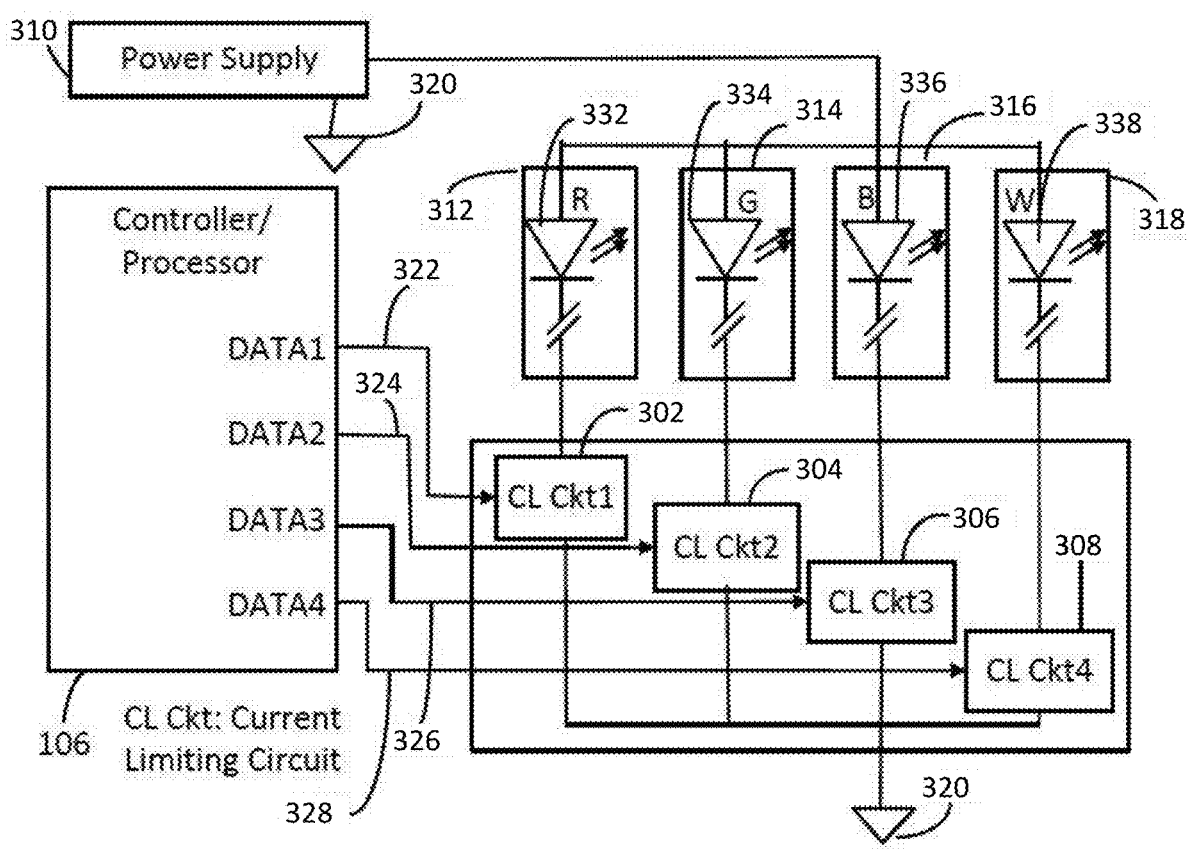
FIG. 3 is a circuit diagram of current limiting circuit scheme in accordance with one embodiment of the present invention.

Now referring to FIG. 3, a circuit diagram of current limiting circuit scheme 300 in accordance with one embodiment of the present invention is shown. In this scheme, current limiting circuits (302, 304, 306, and 308) control the current passed through to each LED arm (312, 314, 316, and 318). There would be as many current limiting circuits as LED arms that are required for the specific embodiment of the II Device. The controller/processor 106 sends data to the individual current limiting circuit (302, 304, 306, and 308) and defines the current to be passed through to the respective LED arm (312, 314, 316, and 318). A digital potentiometer could be used to form the current limiting circuit (302, 304, 306, and 308). The resistance of potentiometer is proportional to the data given to it by controller/processor 106.

For example, to produce a yellow light consisting of 50% Red and 50% Green light at 100% possible output luminosity, DATA1 322 and DATA2 324 will set the currents through current limiting ckt1 302 and ckt2 304 such that the current splits in half through two arms (DATA3 326 and DATA4 328 will be zero). For example, if power supply 310 is able to provide 1 A current, ckt1 302 and ckt2 304 will be set at 0.5 A each. Considering the embodiment contains red, green, blue, and white LED arms (312, 314, 316 and 318 respectively), based on established color mixing principals, the variation in the luminosity of these four colors could produce all color combinations. Setting assigned currents through all circuits (302, 304, 306, and 308), any color, saturation, and brightness within specified limits could be achieved. In other embodiments, the LEDs (332, 334, 336, 338) can be replaced or augmented with alternative lighting components and technologies including but not limited to CFLs, Halogen, and Incandescent. The power supply 310 and circuits (302, 304, 306, and 308) are connected to ground 320.

Figure 5:
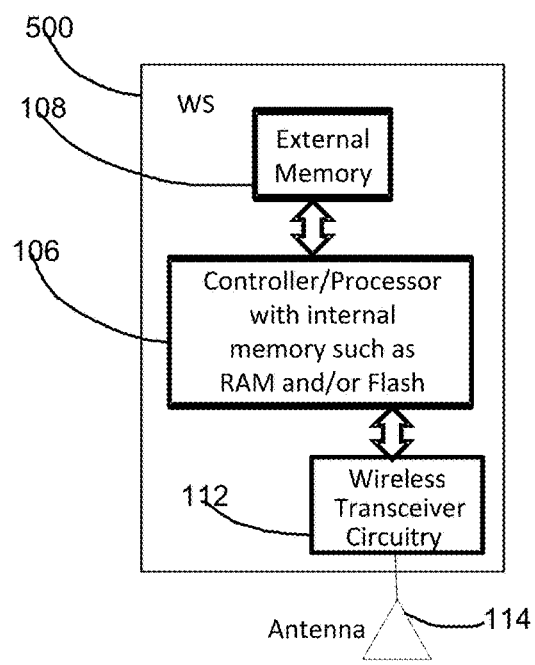
FIG. 5 is a block diagram of a wireless device (WS) in accordance with one embodiment of the present invention.

As shown in FIGS. 3 and 5 of U.S. Pat. No. 9,113,528, the Power supply that is AC/DC and/or DC/DC converter would have limited power or current it could provide. The signal or Data controlling the current limiting circuit of LED strings could be Analog signals either from controller or from a Digital to Analog converter controlled by controller. The current limiting circuit could be analog current control circuit, i.e. the current could be controlled in analog mode and not PWM or switching mode. For example, the signal/data would be such that the current controlling circuit would change current from 0 A to max, let's say 1 A and current remains continuous and not switching. In addition, an algorithm is required to ensure the total current or power from the power supply/LED driver doesn't exceed the limit. Consider, here each LED string can have different combined forward voltage, such as White string can have 12V, Red can have 7V, Blue and Green can have 6V each. Considering the scenario that as these strings are in series, the current through each string is same, therefore, the power drawn by each string is different when current flows through them as per their forward voltages. Consider a scenario where total power available that can be dissipated in a system is limited, because of various limitations such as that of power supply, LED driver, thermal, etc. In this scenario a special algorithm is required such that the LED current through strings are controlled to ensure in no case average power required by LED strings to turn ON doesn't exceed the total available power. For example, consider that total power available for LED string is 12 W and max current through each LED string is 1 A. In such case, when white LED string with forward voltage of 12V is ON, the power taken is 12 W, similarly, Red, Green, Blue will take 7 W, 6 W, 6 W respectively. Special algorithms for various scenarios are required to ensure power limit and also maximize the average ON time for which current is passing through LED strings to get highest possible light output. In one case consider a Cyan color is formed by passing equal current through Blue and Green, which is possible by turning Switches 3 and 4 each with equal power through them so that Blue and Green LEDs draw 6 W average power each with combined 12 W. Similarly, consider that orange color is formed by turning Red and Green at equal power, in such case, if Green is ON with 50% current, i.e. 0.5 A time, Red needs 6 W (available)/7 W (required)×50%=42.8% total current i.e. 0.428 A, thus combined 12 W. Similarly, for any color combination involving any number of colors, percentage current for each color string need to be calculated and Signals/Data (Data 1 to Data 4) are controlled such that current of each LED strings are proportional to respective percentages calculated and total average power drawn by all LEDs is maximum, 12 W in this case. Another case, when a color is formed by keeping Red at 30% power, White 50% power, and green 20% power, then Signals/Data will be calculated as below: 30%*7/12=17.5% current for Red LED, 50%*12/12=50% current for White LED, and 20%*6/12=10% current for Green LED. This algorithm is to get maximum light output for a given color formed by a combination of various LED strings.

Figure 4:
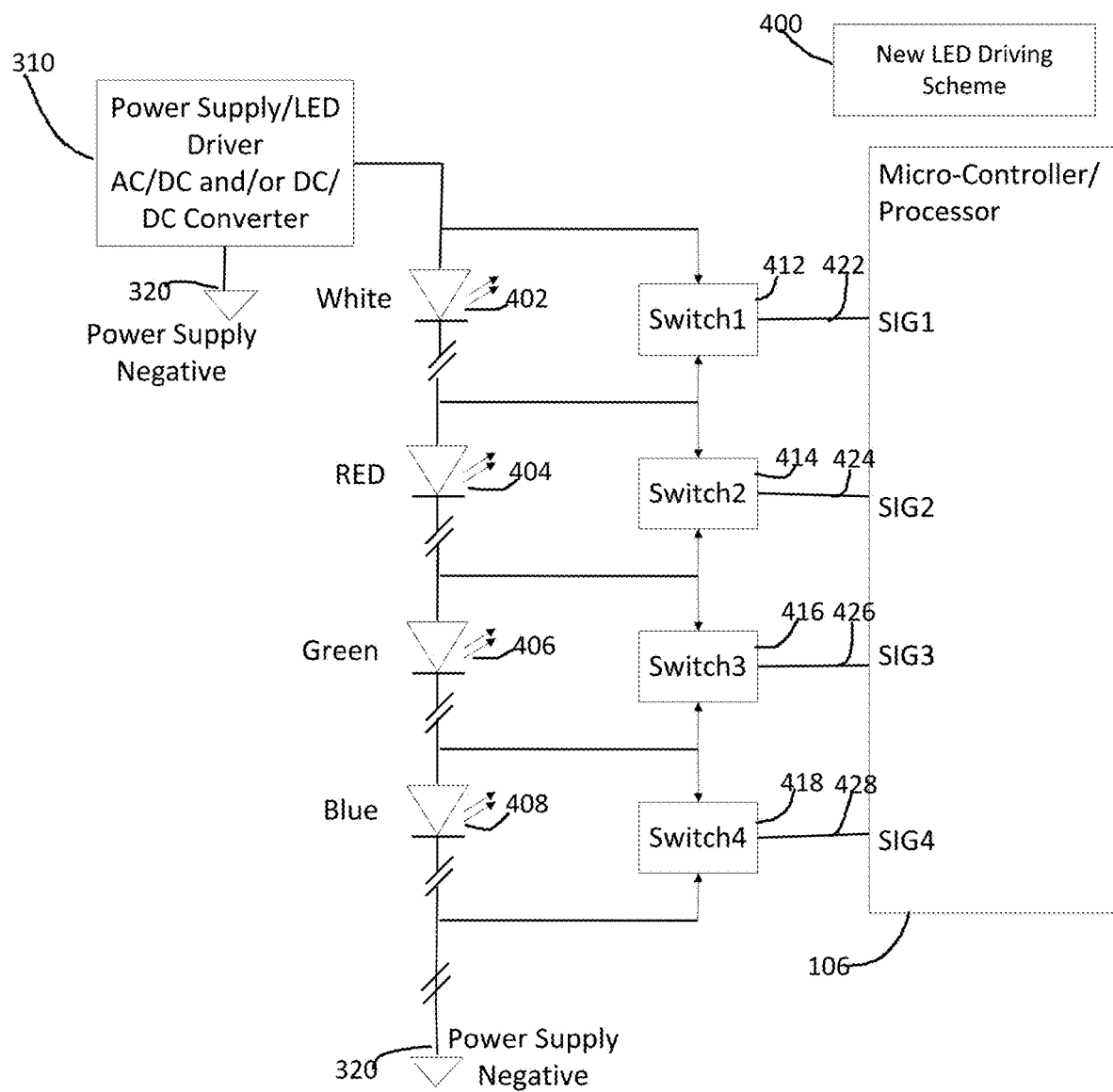
FIG. 4 is a block diagram of current limiting circuit scheme in accordance with one embodiment of the present invention.

Referring now to FIG. 4, a block diagram of current limiting circuit scheme 400 in accordance with one embodiment of the present invention is shown. Here all LEDs, different color LED strings such as White 402, Red 404, Green 406, Blue 408, etc. are in series with one another between the power supply 310 and the power supply negative 320. Each individual color string can have LEDs in series, parallel or combination of series and parallel. The switches (412, 414, 416, 418) are across (connected in parallel) each LED string (402, 404, 406, 408) so that when the switch is ON, current passes through switch and its corresponding LED string is OFF, while when Switch is OFF, current passes through its corresponding LED string turning that LED string ON. Here each LED string can have different combined forward voltage, such as White string 402 can have 12V, Red 404 can have 7V, Blue 406 and Green 408 can have 6V each. Considering the scenario that as these strings are in series, the current through each string is same, therefore, the power drawn by each string is different when current flows through them as per their forward voltages. The switches (412, 414, 416, 418) are controlled by the micro-controller/processor 106 via signal SIG1 422, SIG2 424, SIG3 426 and SIG4 428.

Consider a scenario where total power available that can be dissipated in a system is limited, because of various limitations such as that of power supply, LED driver, thermal, etc. In this scenario a special algorithm is required such that the LED strings are controlled ON/OFF to ensure that the average power required by LED strings to turn ON does not exceed the total available power. For example, consider that total power available for LED string is 12 W and current through LED string is 1 A. In such case, when white LED string 402 with forward voltage of 12V is ON, the power taken is 12 W, similarly, Red 404, Green 406, Blue 408 will take 7 W, 6 W, 6 W respectively. Special algorithms for various scenarios are required to ensure power limit and also maximize the average ON time for which current is passing through LED strings to get highest possible light output. In one case consider forming a cyan color by passing equal current through Green 406 and Blue 408, which is possible by turning Switch3 416 and Switch4 418 ON for 50% of the time so that Green 406 and Blue 408 LEDs draw 6 W average power each with combined 12 W. Similarly, consider forming an orange color by turning Red 404 and Green 406 ON at equal power, in such case, if Green 406 is ON for 50% time of a time cycle, Red 404 needs to be ON for 6 W (available)/7 W (required)×50%=42.8% time of a time cycle, thus combined 12 W. Similarly, for any color combination involving any no. of colors, percentage times for each color string need to be calculated and signals (SIG1 422, SIG2 424, SIG3 426 and SIG4 428) are controlled such that the ON time of each LED string is proportional to respective percentages calculated and total average power drawn by all LEDs is maximum, 12 W in this case. Another case, when a color is formed by keeping Red 404 at 30% power, White 402 at 50% power, and Green 406 at 20% power, then signals will be calculated as below: 30%*7/12=17.5% ON time for Red LED 404, 50%*12/12=50% ON time for White LED 402, and 20%*6/12=10% ON time for Green LED 406. This algorithm provides a maximum light output for a given color formed by a combination of various LED strings.

Figure 6:
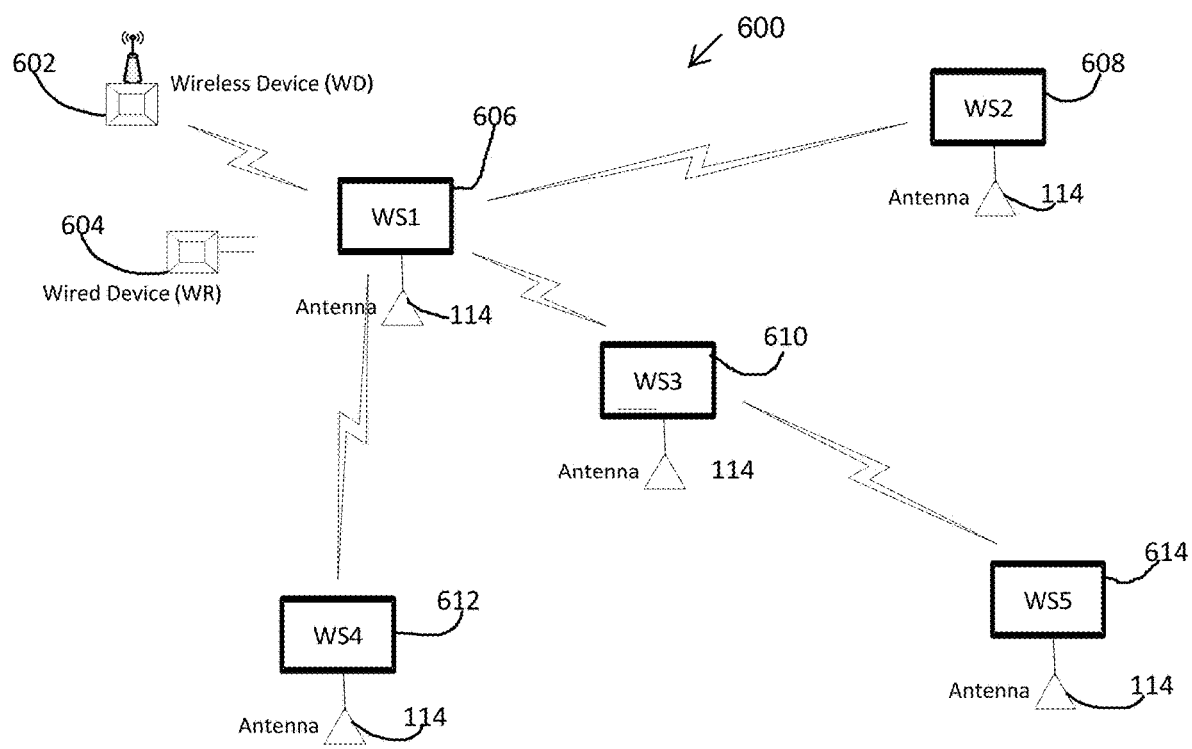
FIG. 6 is a block diagram of a wireless network of devices in accordance with one embodiment of the present invention.

Now referring to FIGS. 5 and 6, block diagrams of a wireless device (WS) 500 used in a wireless system and a network of wireless devices 600, respectively, are shown in accordance with one embodiment of the present invention. The wireless device (WS) 500 includes a controller/processor with internal memory such as RAM and/or flash memory 106, an external memory 108 communicably coupled to the controller/processor 106, wireless transceiver circuitry 112 communicably coupled to the controller/processor 106, and an antenna 114 communicably coupled to the wireless transceiver circuitry 112. Note that in some embodiments, the wireless device (WS) 500 is a lighting device as previously described in reference to FIG. 1.

When there are multiple controlling devices, such as wireless device (WD) 602 (e.g., a smart phone) or wired device (WR) 604, controlling various wireless devices (WS1-WS5) 606, 608, 610, 612, 614 (e.g., smart bulbs) within the network 600 becomes a challenge. Consider a communication protocol, such as Bluetooth, which has limitation on the mesh networking, where a particular smart device can connect to one or very few other devices and can only be of master or slave configuration. It limits the number of controlling devices that can control the smart devices in a mesh. Only few smart devices can be directly or through other smart devices. In addition, the ones which are connected to one controlling devices cannot get connected to the other controlling device. In such case, seamless controlling of smart devices through multiple controlling devices is not possible. However, a process of passing the control from one controlling device to the other can help provide control from multiple controlling devices. Consider a tree based mesh network formed by multiple wireless devices, such as Bluetooth devices where first Bluetooth device can act as a master device connected to three devices. Only slave devices can get commands from the master device and vice versa may not be possible. Also, slave devices may not be able to connect to more than one master device. However, the slave device can connect to another three devices and can be master of those three devices. Given such limitations, only one controlling device can control one entire mesh network.

Figure 7:
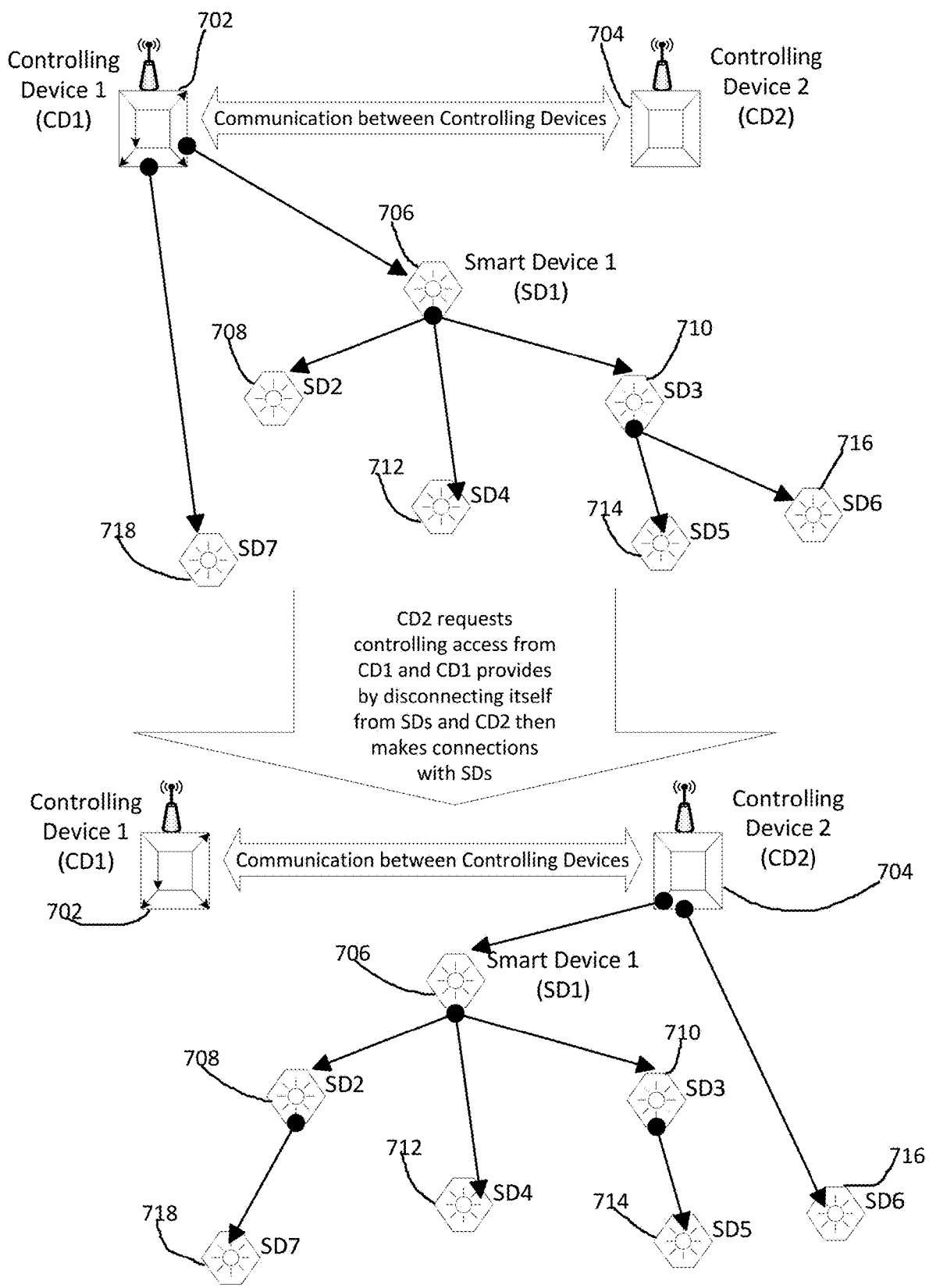
FIG. 7 is a block diagram of a wireless network of devices illustrating a process to launch a multi-control devices signal strength control process in accordance with one embodiment of the present invention.
Figure 8:
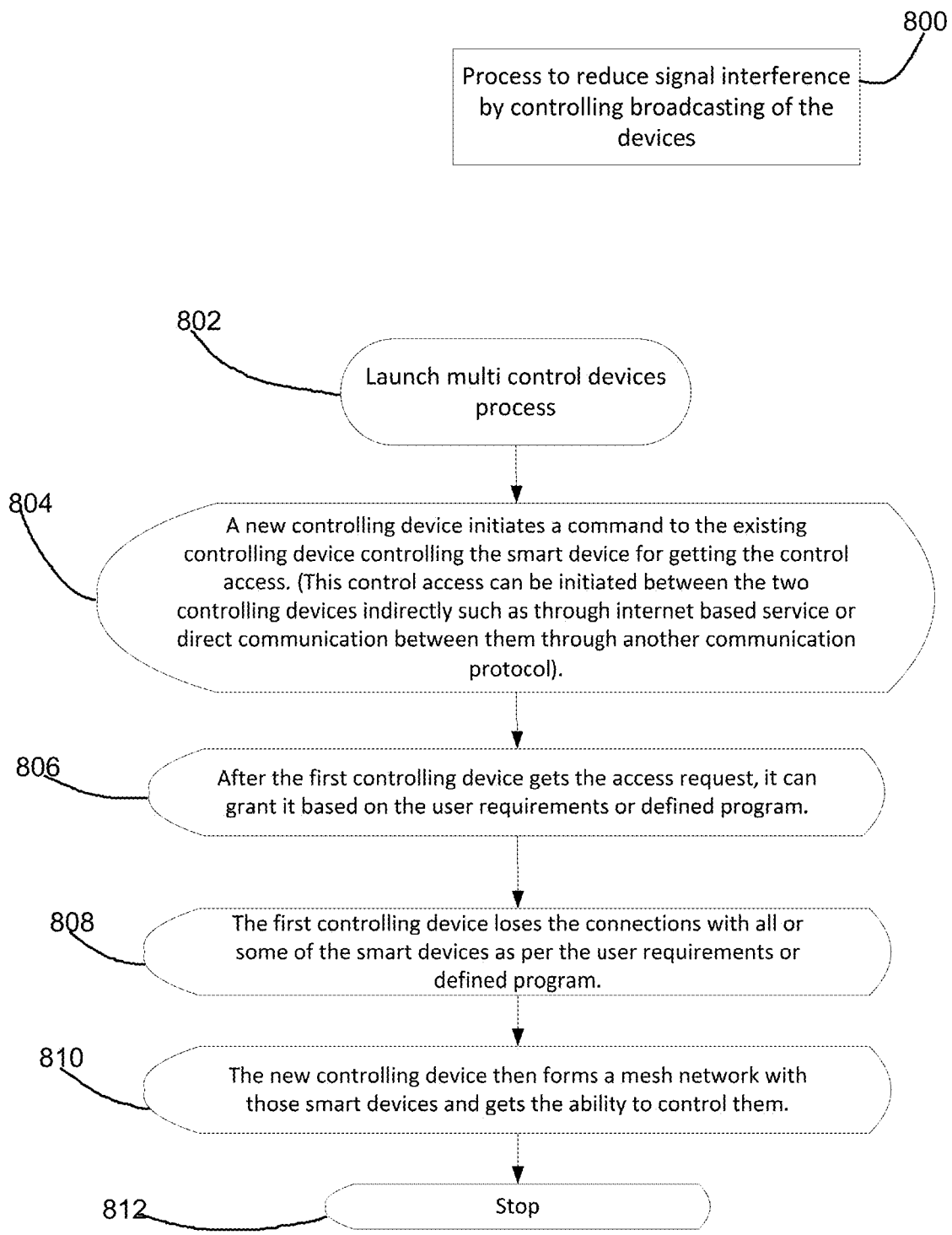
FIG. 8 is a flow chart of a process to launch a multi-control devices process in accordance with one embodiment of the present invention.

As shown in FIGS. 7 and 8, a process 800 forms a new mesh network when another controlling device (CD2) 704 wants to control the smart devices (SD1-SD7) 706, 708, 710, 712, 714, 716, 718 that are currently controlled by controlling device (CD1) 702. With this process, the first controlling device (CD1) 702 will essentially lose the connections with smart devices (SD1-SD7) 706, 708, 710, 712, 714, 716, 718 and the new controlling device (CD2) 704 will build the connections with smart devices (SD1-SD7) 706, 708, 710, 712, 714, 716, 718. Below are the steps to achieve such control of smart devices from multiple controlling devices. Note that this process 800 reduces signal interference by controlling signal broadcasts to the smart devices. The multi-control devices process is launched in block 802.

When a controlling device wants to control the smart devices in a network being controlled by the other controlling device, it initiates a command to the existing controlling device controlling the smart devices to get control access to the smart devices in block 804. This control access can be initiated between the two controlling devices indirectly such as through Internet based service or direct communication between them through at least one communication protocol, such as Wi-Fi, BLE, etc. After the first controlling device gets the access request, it can grant it based on the user requirements or defined program in block 806. The first controlling device loses the connections with one or more of the smart devices as per the user requirements or defined program in block 808. The new controlling device then forms a mesh network with those smart devices and gets the ability to control them in block 810 and the process stops thereafter in block 812. A similar process happens when another controlling device wants to control the smart devices.

Figure 9:
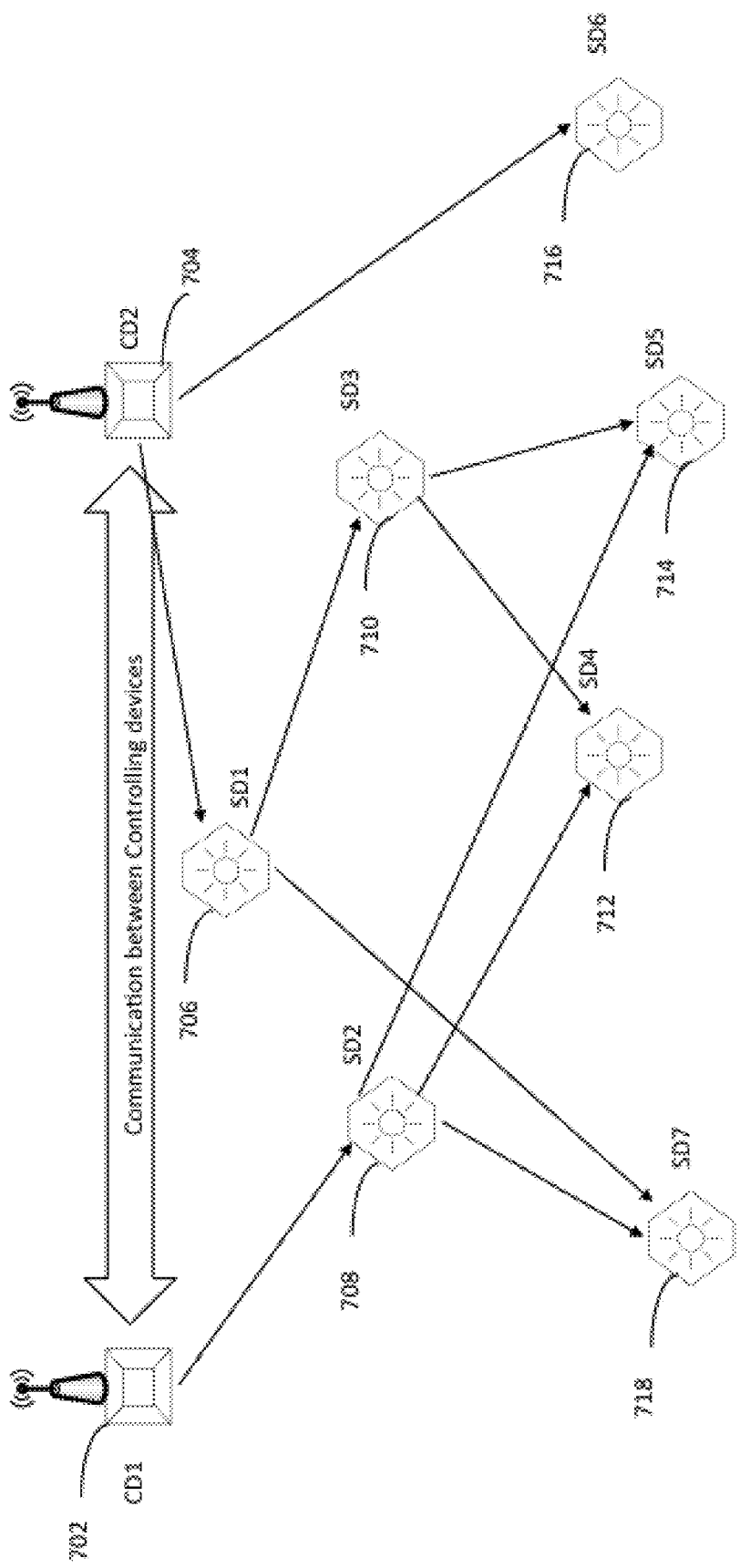
FIG. 9 is a block diagram of a wireless network of devices illustrating a multi-control devices process in accordance with one embodiment of the present invention.

Furthermore, when both the controlling devices CD1 702 and CD2 704 want to control the smart devices (SD1-SD7) 706-718 in a network, they can form a connection network as shown in FIG. 9. The controlling device CD1 702 connects to some smart devices SD2 708, SD4 712, SD5 714, SD7 718 and CD2 connects to some smart devices SD1 706, SD3 710, SD4 712, SD5 714, SD6 716, SD7 718. In this case though, the protocol used in the smart devices allows them to connect as CD1's connected smart devices and CD2's connected smart devices. Such connections would allow both the controlling devices CD1 702 and CD2 704 to control all smart devices.

Figure 10:
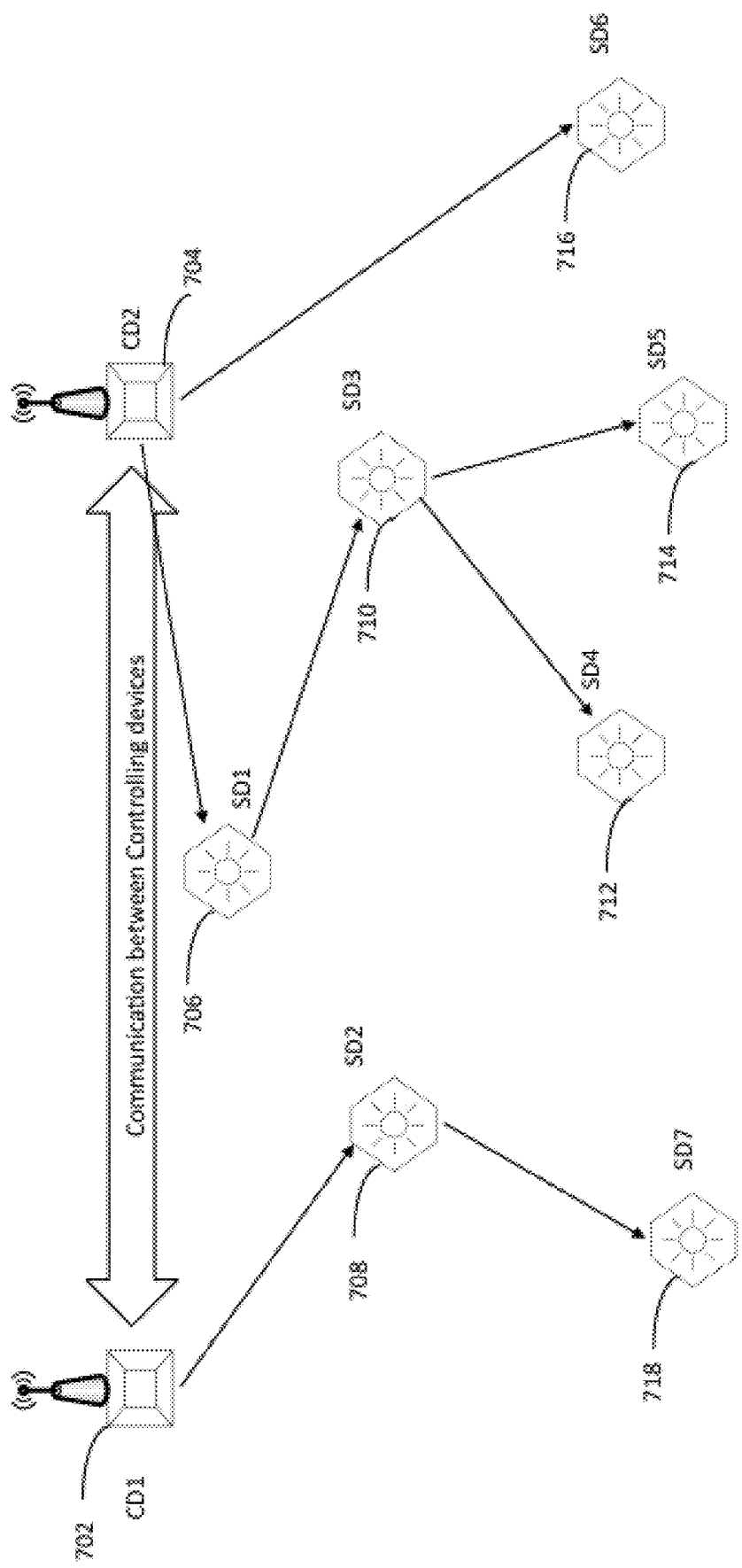
FIG. 10 is a block diagram of a wireless network of devices illustrating a multi-control devices process in accordance with one embodiment of the present invention.

Also, in some protocols such as Bluetooth Low Energy protocol, broadcast messages are allowed, which means, smart device can broadcast the commands or data to other individual or multiple smart devices irrespective of any actual communication links between them. For example and as shown in FIG. 10, SD2 708 will be able to send a command to SD6 716 even if there is no established direct or indirect communication link between them. As shown the established communication links are the controlling device CD1 702 is connected to smart devices SD2 708 and SD7 718, and CD2 is connected to smart devices SD1 706, SD3 710, SD4 712, SD5 714 and SD6 716.

For example, two or more wireless devices are controlled by providing the two or more wireless devices, a first controlling device communicably coupled to the two or more wireless devices via one or more first wireless network connections, and a second controlling device that is not communicably coupled to the two or more wireless devices via the wireless network. Each wireless device includes a controller/processor, a wireless transceiver circuit communicably coupled to the controller/processor and an antenna communicably coupled to the wireless transceiver circuit. A control access request is sent from the second controlling device to the first controlling device requesting control of at least one of the two or more wireless devices. The one or more first wireless connections between the first controlling device and the at least one of the two or more wireless devices are dropped whenever the control access request satisfies one or more parameters. One or more second wireless network connections between the second controlling device and the at least one of the two or more wireless devices are established, and thereafter the at least one of the two or more wireless devices are controlled using the second controlling device. Note that the two or more wireless devices can be part of a network, and the control access request or the control access acceptance may not apply to all the wireless devices within the network. The process may also include the steps of sending a control access acceptance or denial from the first controlling device to the second controlling device based on whether the control access request satisfies the one or more parameters, and/or defining the one or more parameters based on one or more user requirements, program requirements, device requirements, network requirements, or a combination thereof. In some cases, the first controlling device may retain control over a first group of wireless devices within the network, and the second controlling device establishes control over a second group of wireless devices within the network.

Figure 11:
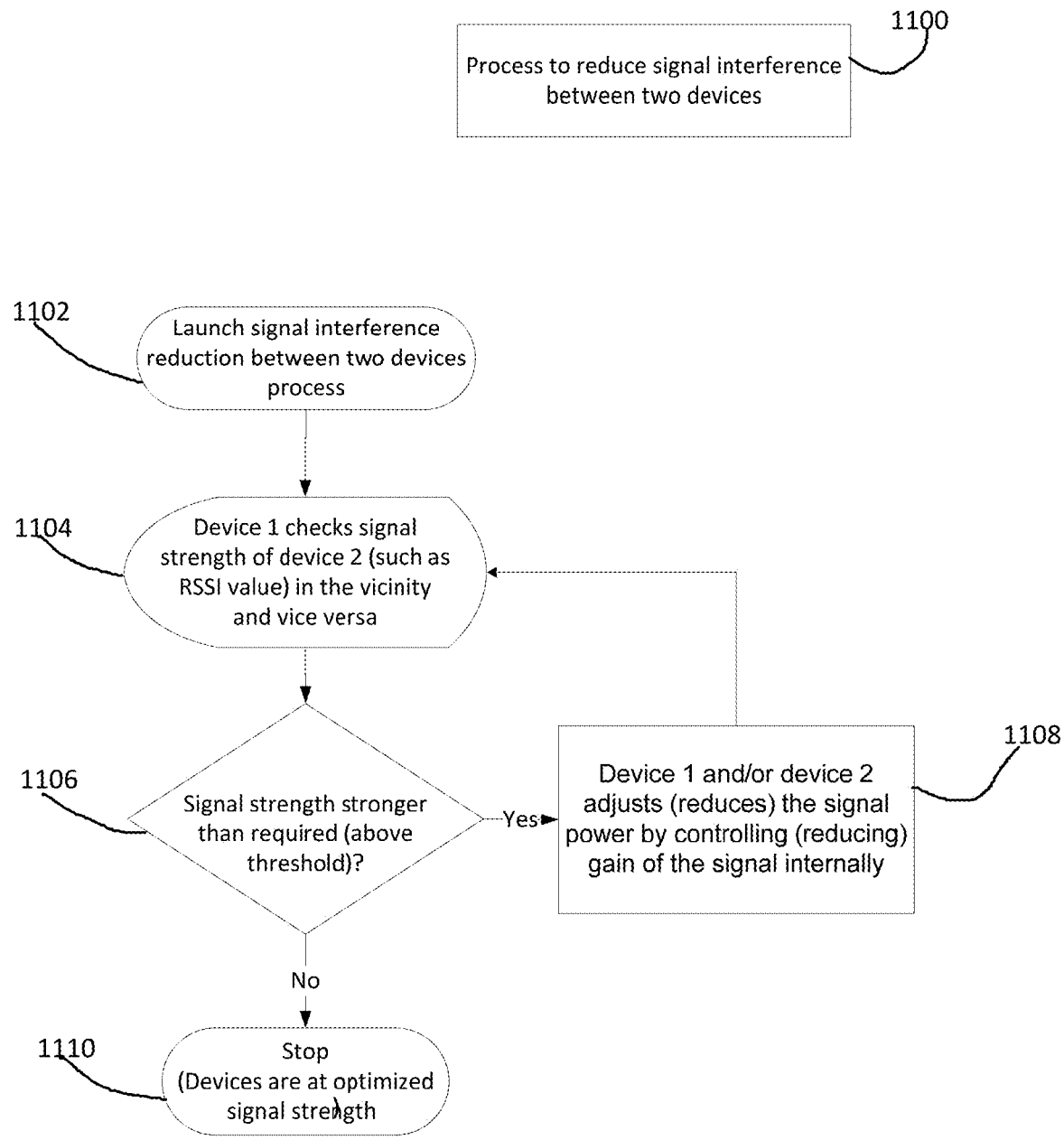
FIG. 11 is a flow chart of a process to reduce signal interference between two devices in accordance with one embodiment of the present invention.

Referring now to FIG. 11, a flow chart of a process 1100 to reduce signal interference between two devices in accordance with one embodiment of the present invention is shown. With the advancement of wireless technology, the wireless processors or wireless signal amplifiers have a feature of controlling the gain. The auto signal strength control to reduce the signal interference and increase signal to noise ratio in an environment with one or more multiple wireless devices will now be explained. The system consists of a wireless IC circuit with antenna communicably coupled to the chip. Wireless IC circuit may consist of wireless processor and wireless signal amplifier circuit electrically and communicably connected to it. Either the wireless IC or the signal amplifier or both have a function by which the signal gain or amplification gain can be set as and when required. Such gain can be set in wireless processor either when it is running, idle or turning ON. Similarly, such gain can be set in the signal amplifier when it is running or idle or turning ON. By controlling the signal strength by controlling the signal gains can help reduce the signal noise around the wireless devices improving signal to noise ration or reducing the signal interference.

The signal interference reduction process between two wireless devices begins in block 1102. Device 1 measures the device signal strength of the device 2 and in some cases vice versa in block 1104. The signal strength measurement can be RSSI (Received Signal Strength Value) or other desired metric. If the signal strength values are such that communication strength (link) between the devices is high (e.g., above a threshold value) and there is a room to reduce the signal strength as determined in decision block 1106, then one or both the devices reduces the signal strength either while they are running or by resetting themselves or by controlling (reducing) the signal amplifier gain in block 1108 and the process repeats to check the signal strength of the same device or other devices in block 1104. If, however, the communication strength (link) between the devices is not high (e.g., below a threshold value), as determined in decision block 1106, the process stops in block 1110 since the devices can be said to be operating an optimized signal strengths.

For example, signal interference can be reduced between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is determined as measured by either or both of the wireless devices. A signal power of either or both of the wireless devices is reduced whenever the signal strength exceeds a threshold value. Note that the first wireless device or the second wireless device can be a controlling device. Moreover, the signal power can be reduced or increased by adjusting a gain of a signal amplifier within the wireless transceiver circuit of either or both of the wireless devices. The step of determining the signal strength can be periodically repeated.

Figure 12:
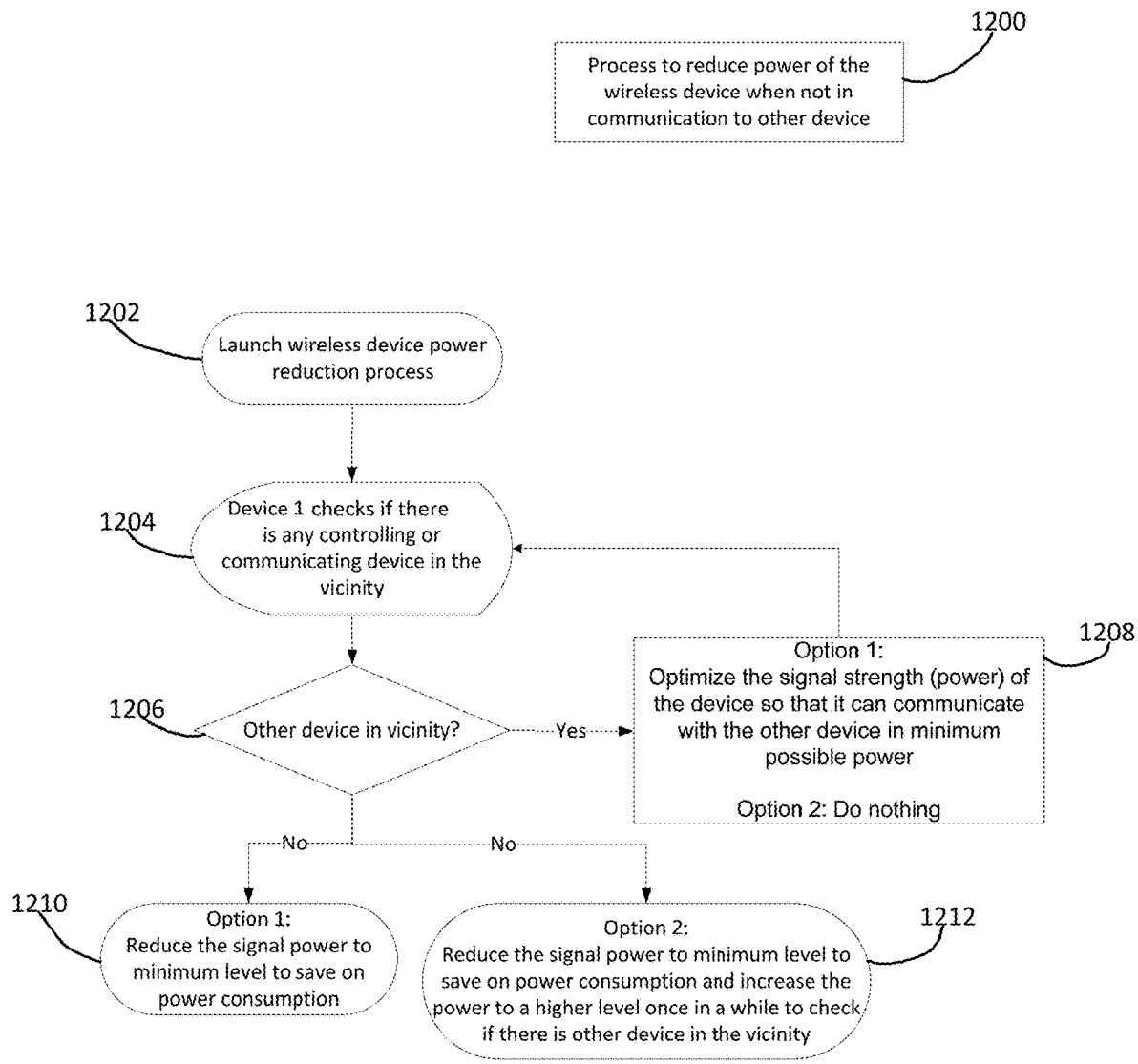
FIG. 12 is a flow chart of a process to reduce power of the wireless device when not in communication with other devices in accordance with one embodiment of the present invention.

Now referring to FIG. 12, a flow chart of a process 1200 to reduce power of the wireless device when not in communication with other devices in accordance with one embodiment of the present invention is shown. In case of the a wireless device system where only two devices are present and one of them comes in the range of the other only during certain times, for example, a wireless sensor that is communicating with a remotely controlling device such as smartphone, the communication takes place only when remote controller is in the vicinity of the wireless sensor. In such cases, a wireless sensor can sense if the remote controlling device is in vicinity or not and based on that can adjust (reduce) the signal strength (power) to a lower value so that the sensor reduces overall power or energy consumption. This process is important in case of battery powered wireless device as it helps improve the battery performance and overall battery life. Higher or highest signal strength can be used in the case where no wireless device present in the vicinity. Otherwise, automatic gain control can be used.

The wireless device looks for the device in the vicinity periodically as per its defined program and controls its signal power by launching the wireless device power reduction process in block 1202. Device 1 checks if there is any controlling or communicating device within its vicinity in block 1204. If another device is detected within the vicinity, as determined in decision block 1206, the wireless device can perform two different options in block 1208. In option one, the wireless device can optimize its signal strength (power) so it communicates with the other device in a minimum possible power mode or a specified reduced power mode or range. In option two, the wireless device can do nothing and operate at its existing power level. Thereafter, the process returns to check for other devices in the vicinity. If however, another device is not detected in the vicinity, as determined in decision block 1206, the wireless device can perform one of two different power conservation modes in blocks 1210 or 1212. In option one, the wireless device reduces its signal power to a minimum level to reduce power consumption in block 1210. In option two, the wireless device reduces its signal power to a minimum level to reduce power consumption and increase power to a higher level periodically to check for other devices in the vicinity in block 1212. Note that different power modes and ranges can be used as defined by the user or manufacturer or by the operating environment, etc.

For example, the process may include, among other steps, determining whether the first wireless device and the second wireless device are within a specified range of one another, reducing he signal power of either or both of the wireless devices to an optimized level whenever the first wireless device and the second wireless device are within the specified range of one another, reducing the signal power of either or both of the wireless devices to a minimum level whenever the first wireless device and the second wireless device are outside of a specified range of one another, and/or increasing the signal power of either or both of the wireless devices to a higher level after a specified period of time has elapsed and determining whether the first wireless device and the second wireless device are within the specified range of one another.

Figure 13:
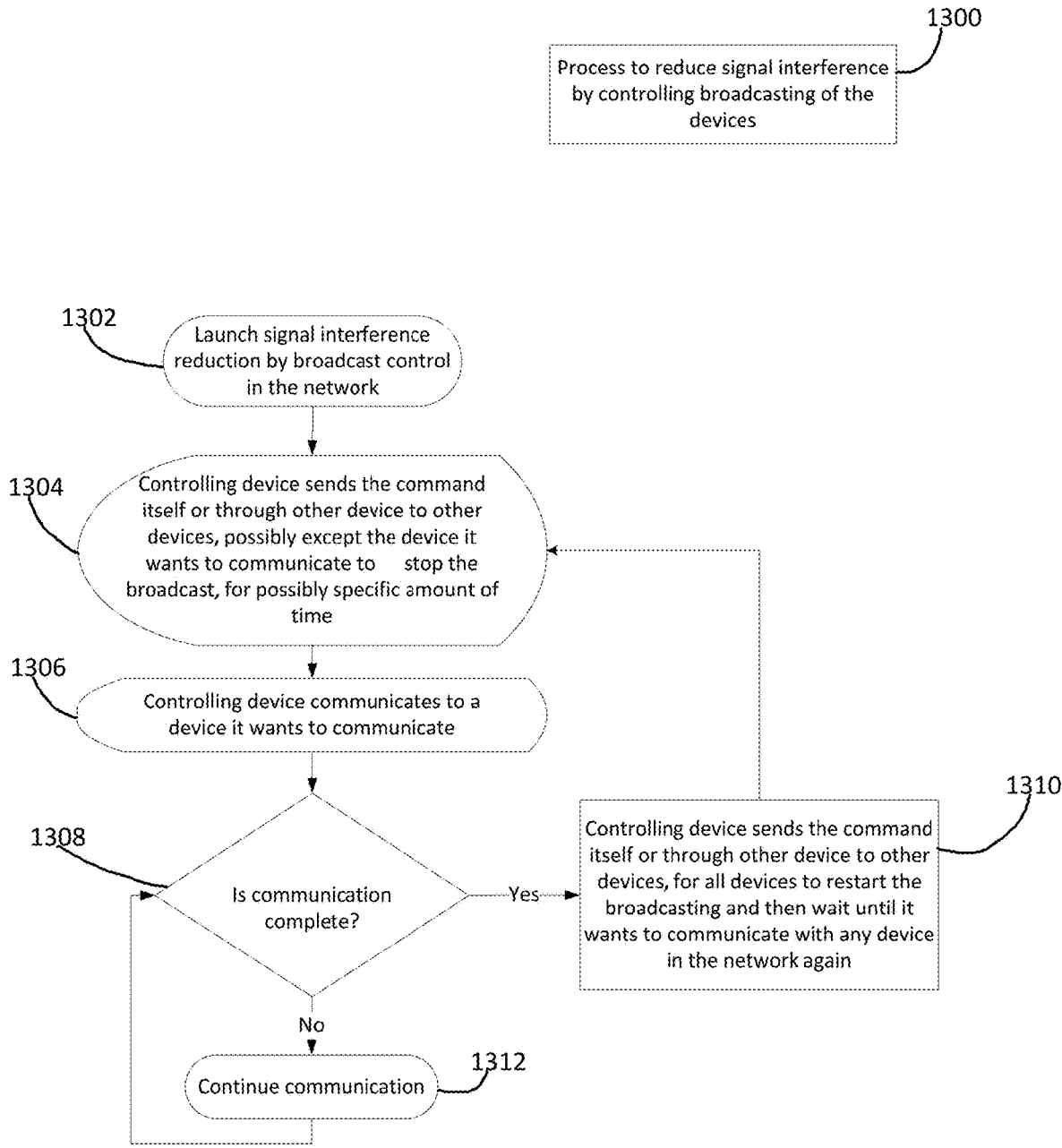
FIG. 13 is a flow chart of a process to reduce signal interference by controlling broadcasting of the wireless devices in accordance with one embodiment of the present invention.

Referring now to FIG. 13, a flow chart of a process 13 to reduce signal interference by controlling broadcast communications of the wireless devices in accordance with one embodiment of the present invention is shown. In various protocols such as Bluetooth 4.0, the devices are broadcasting to form or keep a network or be able to communicate with other devices. When the number of devices in the vicinity is large, the interference in the network is high causing weaker communication link between the devices. In such cases, controlling devices, such as smartphones, cannot efficiently communicate or control the devices. Consider a scenario, where controlling device wants to send data to a particular device in the network. In such case, it can first directly or through a connected device, broadcast a command to all the devices in the vicinity to stop broadcasting, except for any device(s) it wants to communicate with. This reduces the interference in the network and allows the controlling device to easily communicate with the device it wants to. There are two possible cases in such network. In the first case, the devices are required to broadcast to be able to connect and communicate with other devices. The stop broadcast from the controlling device could be for a specified period of time. For example, the controlling device sends command itself or through connected device(s) to stop broadcast for four seconds, an estimated time it requires to communicate with the device it wants to. In the second case, the devices can be only in listening mode and can connect to other device when other device initiates the communication. The broadcast can be initiated only when the controlling device sends a command to these devices, and also possibly for specific period of time.

The signal interference reduction process 1300 by broadcast control in the network is launched in block 1302. The controlling device sends the command itself or through another device to other devices to stop broadcasting in block 1304. The command may not be sent to devices that the controlling device wants to communicate with. Note that the stop broadcasting commence may be for a specific amount of time or some other triggering event. The controlling device then communicates to any devices that it wants to communicate with in block 1306. If the communication is complete, as determined in decision block 1308, the controlling device sends the command itself or through another device to the other devices for all the devices to restart broadcasting and then wait until it wants to communication with any device in the network again in block 1310. When the controlling device wants to communicate with another device, the process loops back to block 1304 where the stop broadcast command is sent. If, however, the communication is not complete, as determined in decision block 1308, the communication is continued in block 1312 and the process loops back to decision block 1308 to determine whether the communication is complete.

For example, two or more wireless devices can be controlled by providing the two or more wireless devices, and a controlling device communicably coupled to the at least one of the two or more wireless devices via one or more wireless network connections. Each wireless device includes a controller/processor, a wireless transceiver circuit communicably coupled to the controller/processor and an antenna communicably coupled to the wireless transceiver circuit. A broadcast signal is periodically sent from each wireless device. A stop broadcast signal is sent from the controlling device to all of the two or more wireless devices except for one or more specified wireless devices. One or more communications between the controlling device and the specified wireless device are exchanged. A resume broadcast signal is sent from the controlling device to all of the two or more wireless devices after the one or more communications between the controlling device and the specified wireless device are completed. An additional step may include selecting the one or more specified wireless devices. Note that the stop broadcast signal may have a specified duration or expiration.

Resumable firmware updates will now be described. A processor in any wireless device or system can have internal and/or external memory, such as RAM and/or flash memory, as part of the same or different Integrated Chip (IC), where software program also known as firmware can be stored or run. Consider a scenario where multiple similar types of wireless systems those can communicate with each other and another wireless or wired device having the ability to control the system as a part of a bigger wireless system. Many times the wireless systems need to be updated with a new firmware. Here one wireless system can be updated with the wireless or wired device and now the updated wireless system can program other wireless system and in turn they can updated remaining wireless systems in a chain reaction. This can happen automatically without any user interference where two wireless systems communicate with each other find out if one of them have lower firmware version that needs to be updated and initiate the firmware update accordingly. Here the firmware update can be unsuccessful for various reasons such as the system is powered off in the middle of the update or systems get disconnected due to low wireless signal strength or signal interference because of multiple other wireless systems and devices. In such situation resumption of an update at a later stage is required that is automatic and without the requirement of any user intervention also called here as resumable firmware update now on. To achieve such implementation of resumable firmware update, a few specific programs/algorithms need to be part of the firmware as below.

Each firmware version will have a specific number based on which the systems will understand if it or the other it is communicating with has lower firmware version that needs to be updated. This firmware version may not change until the firmware update is successfully completed, i.e., one wireless system with lower firmware version gets higher firmware version from the other. Another requirement for the resumable firmware update is that the memory in which the firmware is running the processor and its applications is in a separate section of the processor memory or in a totally separate internal or external memory called as a primary memory than the other memory called as a secondary memory where programs or new firmware can be stored. This way the system ensures that the existing lower version firmware is always there to run the processor until updated with the newer version of the firmware. The firmware update can take place in two ways. In the first way, there could be two steps: (1) the new firmware gets copied first in the secondary memory first, and (2) the processor in the system replaces its lower version firmware with the new firmware internally. In the second way, where the secondary memory is limited, and/or there are two parts of the firmware, an application firmware which holds the actual application processing algorithm and the standard part such as bootloader which holds the standard algorithms of firmware update, basic protocols, etc., there could be two steps: (1) Only the part of the firmware which is application firmware is deleted. (2) The standard firmware part (also sometimes bootloader) is kept same and it updates the empty memory with the new application firmware.

When the new firmware is getting copied from one wireless device to other wireless device (also referred to as a copying process herein), there is a possibility that this process breaks for any reason, such as one of the devices is powered off, weak communication link between the devices, wireless device breaks the link to perform any higher priority task, etc. In such situation, the copying will get completed to only a certain percentage, and resumption of this copying process is required. The resumption can happen multiple times from one of the following three options: (1) same two wireless devices when establishes the communication link, they resume the firmware update from where they left before; (2) any other wireless device with the latest firmware version when establishes the communication link with the device that needs to be updated fully can start the firmware update process from the part where the previous device left the firmware update process; or (3) the controlling device when establishes the communication link with the device that needs to be updated fully can start the firmware update process automatically or based on the user inputs.

In any of the above cases, one needs to ensure that the resumption process starts at a stage where it was left before and there are important steps to achieve this. First, the firmware version is not changed until the firmware update process is complete so that whenever one wireless device can know if the other device needs firmware update or not. Second, whenever the firmware update is halted the device that is getting the update ads or changes one parameter in its memory that states to what extend the firmware update is complete or what point it needs to restart at. Third, before any other device with the latest firmware starts updating the firmware of the device with lower version it reads the parameter said above and then starts the firmware update from that point forward. Fourth, the above process can reoccur multiple times until the firmware update process is complete.

Consider scenarios where multiple and various types of wireless devices are present. When such number of wireless devices are available and especially when they are not directly connected to cloud through Internet or any other communication link, updating firmware to these devices becomes difficult task. However, if these devices are working on similar protocols, it is possible to update each other's firmware irrespective of their application or differences in their hardware structures and requirements. The wireless system that consists of different wireless devices with different functionality can be recognized with their firmware number or a parameter set as a part of the firmware residing in the memory. This parameter can also be set based on a hardware configuration difference that is connected to the processor.

Each firmware has at least one of these parts: (1) a protocol stack that can be common for various devices, which defines how one device communicates with other devices, stores in the memory and executes certain parts of the application; and/or (2) an application firmware to carry out the functionality of the device.

Many wireless devices could have limited memory so that they can store only their applications and part of the protocol stack that is required for its functionality. However, a wireless device with larger memory can store broader protocol stack and application for itself and other devices. In such cases, it will become important during the firmware update that the limited memory device gets the firmware that has updated protocol stack and/or updated application. Following steps can achieve this:

1. Higher memory wireless device (HMWD) gets updated firmware from control device as explained before.
2. When HMWD communicates with Limited Memory Wireless Device (LMWD), it confirms whether LMWD needs to be updated based on their firmware versions.
3. The HMWD understands and confirms the application(s) the LMWD needs to be updated. This can be achieved with the following implementations:
    a. The LMWD and HMWD have parameters set in their respective memories such as application ID that defines their current application version.
    b. This ID gets updated as the device gets updated firmware version.
    c. HMWD has application IDs for various LMWDs with which it can decide if it can provide the update to LMWD.
4. HMWD updates the LMWD's firmware through a firmware update process explained before if LMWD has a lower firmware version and HMWD has higher firmware version for the stack and/or application.

In many cases, the similar category wireless devices (WD) have applications pretty similar expect small change required in the application or few parameters. With this even one LMWD can update the firmware of other LMWD as long as it won't put any constraint on the memory. In such situation, different LMWDs in the same category may even have same firmware with the same protocol stack and same application. However, they use different part of the application they are running based on the differentiation of their IDs or hardware. This differentiation can be achieved as below.

1. The WD of the same category will have a different application ID than the other type WD in the same category. With this the WD can run an application that it is supposed to. In other words, it will use part of the application that is associated with that particular application ID.
2. There could be a slight variation in the hardware itself such as there could be a jumper resistor on one of the I/O pins of the processor that is connected to the ground or positive voltage signifying digital 0 or 1 respectively, which is not the case in other same category WD. When WD is powered ON, the firmware can first read the input of this I/O pin that and based on that decide what part of the application needs to be used. Reading the I/O pin input and deciding on what part of the application to be used would be a part of the firmware itself.

A process for proactive scanning in accordance with one embodiment of the present invention will now be described. For one type of wireless devices such as BLE devices/Bluetooth Scan can optimized with other wireless or wired technology such as WiFi network as well as the location awareness based on GPS or indoor navigation system. It will be explained in BLE proactive scanning of BLE devices with respect to WiFi network below.

Figure 14:
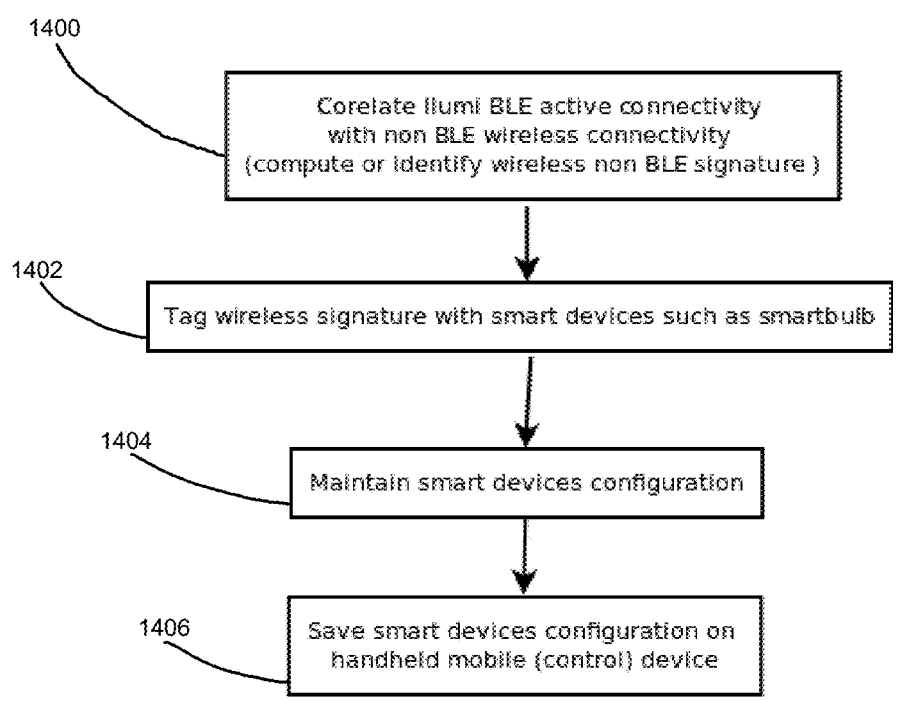
FIG. 14 is a flow chart of a tagging process in accordance with one embodiment of the present invention.

When the user is at home (or any location) where there are BLE devices such as smartbulbs available and connectable over Bluetooth, typically there is also a WiFI connection that the mobile device is connected with, which is identifiable by its SSID (unique identifier). By tagging such the WIFI SSID (unique identifier) with a set of BLE devices that are likely to become reachable over BLE as shown in FIG. 14, whenever the mobile device is reachable over WiFi, the scanning, connectivity and control can be optimized. Ilumi BLE active connectivity is correlated with non BLE wireless connectivity (compute or identify wireless non BLE signatures) in block 1400. The wireless signatures are tagged with smart devices, such as smartbulbs, in block 1402. The configuration of the smart devices is maintained in block 1404. The configuration of the smart devices are saved on the handheld mobile (control) device in block 1406.

Figure 15:
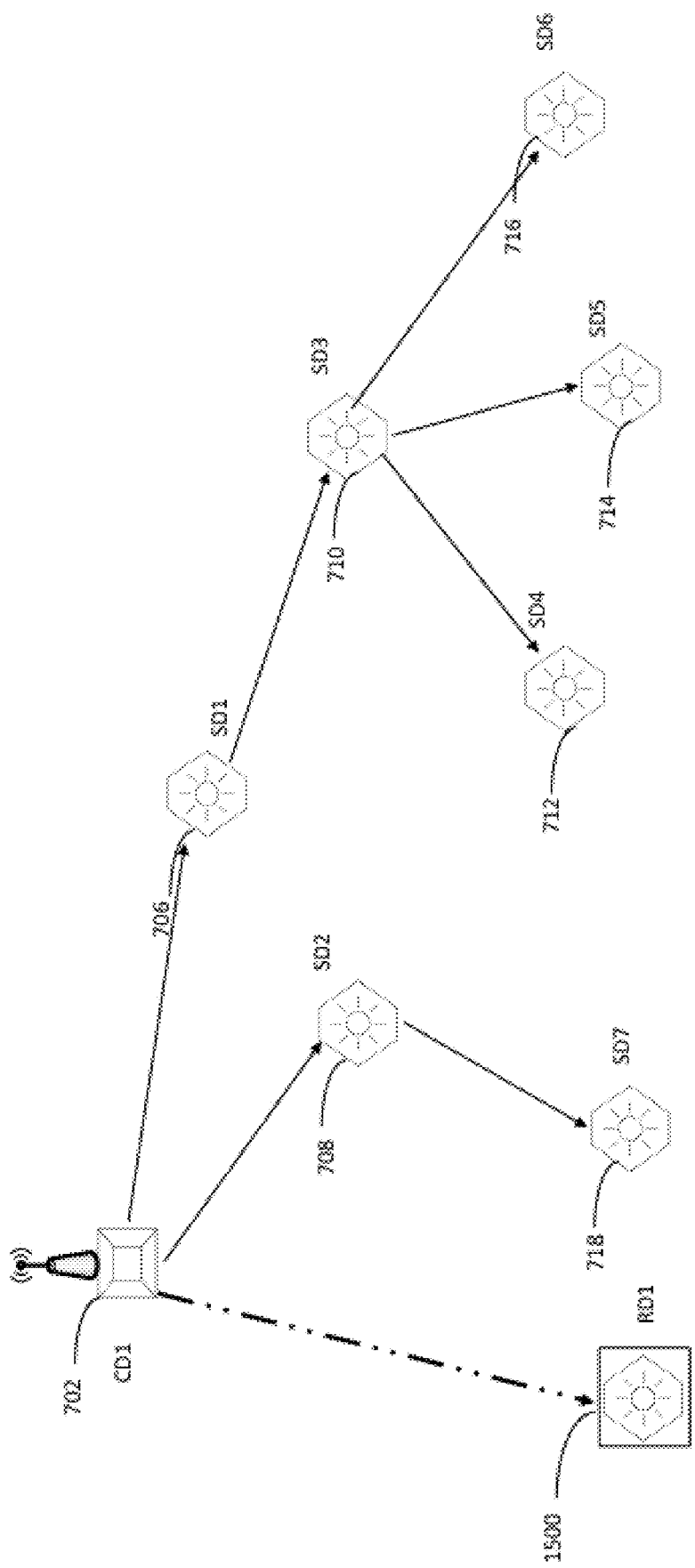
FIG. 15 is a block diagram of a wireless network of devices illustrating a multiple protocol process in accordance with one embodiment of the present invention.

For instance, the user can set a rule that the BLE devices be turned on when the user arrives home (without having to start the app on the controlling device such as smartphone). In order to optimize power consumption on the control device and avoid performing BLE scans when the control device and the BLE devices are not in BLE range, the user of the Wi-Fi connectivity status serves as a trigger. For example and as shown in FIG. 15, CD1 702 has two wireless protocols, say Wi-Fi and BLE. The Wi-Fi protocol can be kept ON continuously and when CD1 702 finds RD1 1500 (Router Device 1), in the same vicinity where other smart devices SD1 to SD7 (706-718) with BLE protocol are present, it triggers to turn the BLE turn on in itself and form a network to connect to all the smart devices from SD1 to SD7 (706-718).

Figure 16:
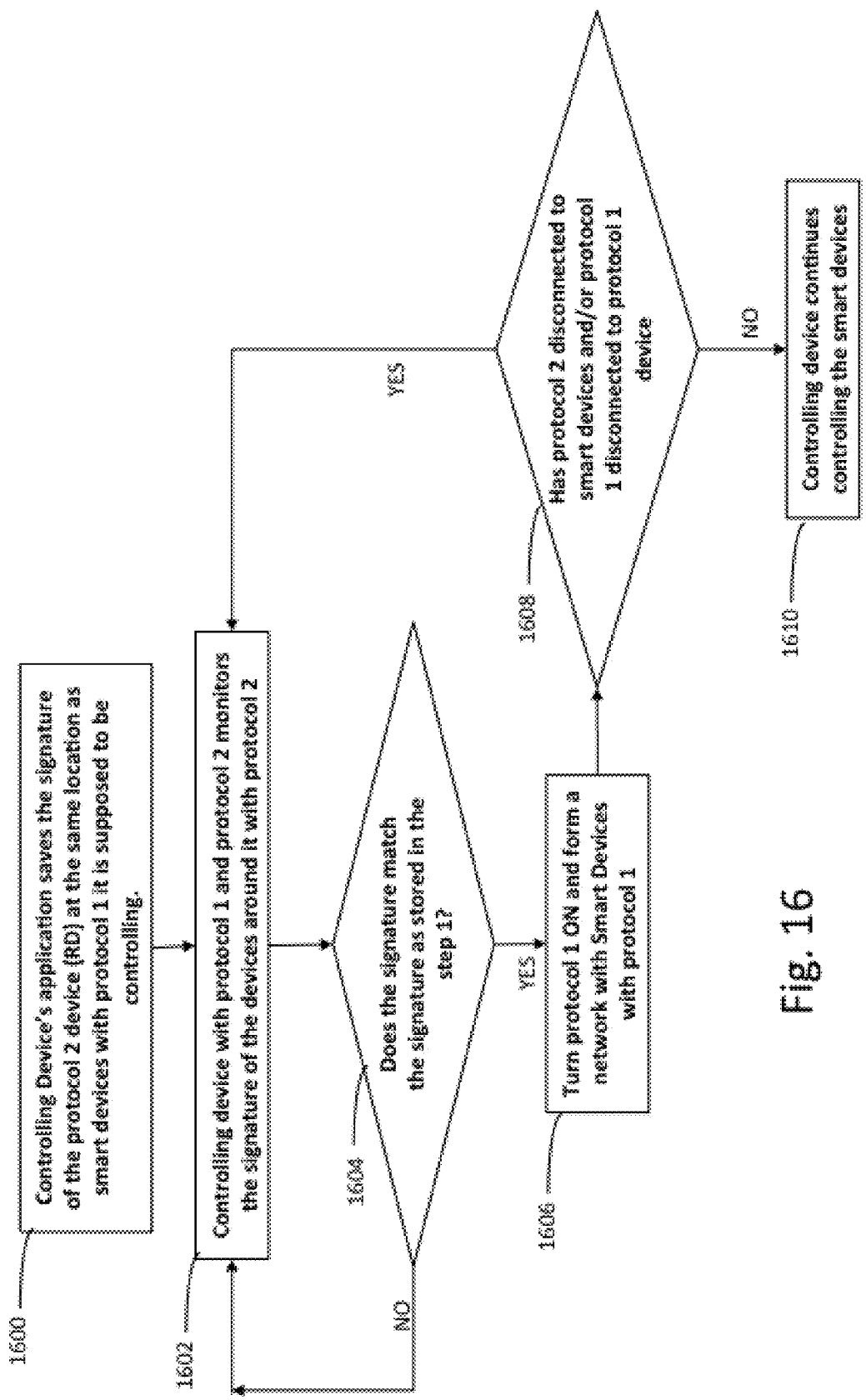
FIG. 16 is a flow chart of a multiple protocol process in accordance with one embodiment of the present invention.

The process is illustrated in FIG. 16. The application of the controlling device CD1 702, having two or more protocols, saves the signature of at least one other protocol, such as protocol 2 device RD1 1500, at the same location as the smart devices with protocol 1 that it is supposed to be controlling in block 1600. The controlling device CD1 702 having protocol 1 and protocol 2 monitors the signatures of the devices around it with protocol 2 as per the application requirement in block 1602. If the monitored signature does not match the saved signature, as determined in decision block 1604, the process loops back to block 1602 to monitor the signatures. If, however, the monitored signature matches the saved signature, as determined in decision block 1604, the controlling device CD1 702 turns protocol 1 ON and forms a network with the smart devices SD1 to SD7 (706-718) with protocol 1 in block 1606. If the controlling device CD1 702 becomes disconnected from the protocol 2 device RD1 1500 and/or the protocol 1 smart devices SD1 to SD7 (706-718), as determined in decision block 1608, the process loops back to block 1602 to monitor the signatures. If, however, the controlling device CD1 702 has not become disconnected from the protocol 2 device RD1 1500 and the protocol 1 smart devices SD1 to SD7 (706-718), as determined in decision block 1608, the controlling device CD1 702 continues controlling the smart devices SD1 to SD7 (706-718) in block 1610.

For example, two or more wireless devices are controlled by providing the two or more wireless devices that communicate using a first protocol, and a controlling device that communicates using the first protocol and a second protocol. The controlling device has a stored second protocol device signature associated with a location proximate to the two or more wireless devices. Each wireless device includes a controller/processor, a wireless transceiver circuit communicably coupled to the controller/processor and an antenna communicably coupled to the wireless transceiver circuit. Any wireless routing devices or access devices that communicate using the second protocol and have a device signature that matches the stored second protocol device signature are detected. One or more network connections between the controlling device and the two or more wireless devices are established using the first protocol whenever the device signature of the detected wireless routing device or access device matches the stored second protocol device signature, and thereafter the two or more wireless devices are controlled using the controlling device. Additional steps may include associating the two or more wireless devices with the second protocol device signature of the wireless routing device or access device proximate with the location, and storing the second protocol device signature, repeating the detection of any wireless routing devices or access devices whenever the controlling device is disconnected from the wireless routing device or access device associated with the location or the two or more wireless devices, and/or turning the first protocol communication ON whenever the device signature of the detected wireless routing device or access device matches the stored second protocol device signature.

Figure 17:
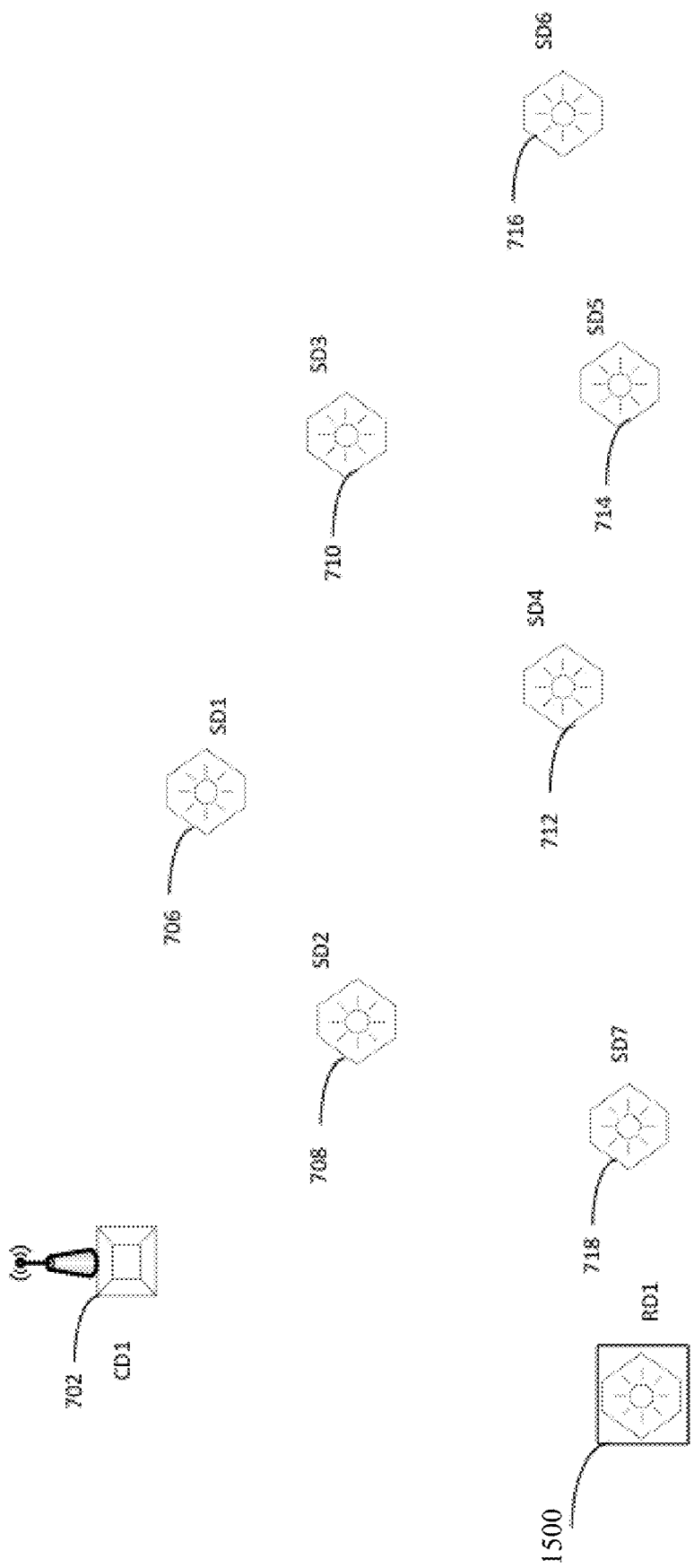
FIG. 17 is a block diagram of devices illustrating detecting an intruder in accordance with one embodiment of the present invention.

Now proximity sensing using a change in the signal strength between various wireless devices will be explained in reference to FIG. 17. There are multiple wireless devices SD1 to SD7 (706-718) in a given network at a given location. Each device SD1 to SD7 (706-718) broadcasts a wireless signal, such as its identification number, which can be picked up by another device in the network. Similarly, such a signal can also be transmitted by the later device and picked up by the earlier device. The signal strength between two wireless devices is usually measured with a parameter RSSI (Received/Radio Signal Strength Indicator). A wireless device can provide a specific number in a signal strength unit, such as decibel-milliwatts (dbm), for another wireless device that indicates the signal strength between those two devices. These devices can be any device using a wireless protocol. The signal strength changes as environmental parameters such as temperature, humidity, noise due to other living and non-living things, noise due to electronic, electrical and magnetic devices change. However, an assumption can be made that at a particular time frame and particular environmental conditions, the RSSI value between two wireless devices should be a given fluctuation range, ideally constant.

The wireless signal strength fluctuates more as the signal is either absorbed, reflected or scattered because of external phenomenon. These phenomena could be anything, such as sudden change in the temperature, sudden addition or subtraction of wireless noise of external things, etc. Even the human body entering into a vicinity of the networked devices could cause such a sudden change as the water in the body would absorb some signal strength, other chemical compositions of the body could absorb, scatter or reflect the wireless signal. This affects the RSSI between two wireless devices. This can be used as an intruder detection or motion detection application, especially in a closed vicinity of two or more wireless devices having the same protocol or ability to talk to each other or with the ability to measure the signal strength between each other.

Consider for example smart devices SD1 706 and SD4 712. The signal strength graph between these devices is illustrated in FIG. 18 for a particular short period of time and at a particular environmental condition. A small fluctuation in the RSSI values can be seen. However, when the environment changes suddenly, such as when a human being enters between SD1 706 and SD4 712, the fluctuations in the RSSI values are much greater as shown in FIG. 19. With that we can say that the standard deviation in the RSSI values in that duration as in FIG. 19 is much higher as compared to that is FIG. 18 without human presence. This change in fluctuations can be used in presence, motion or intruder detection.

Figure 20:
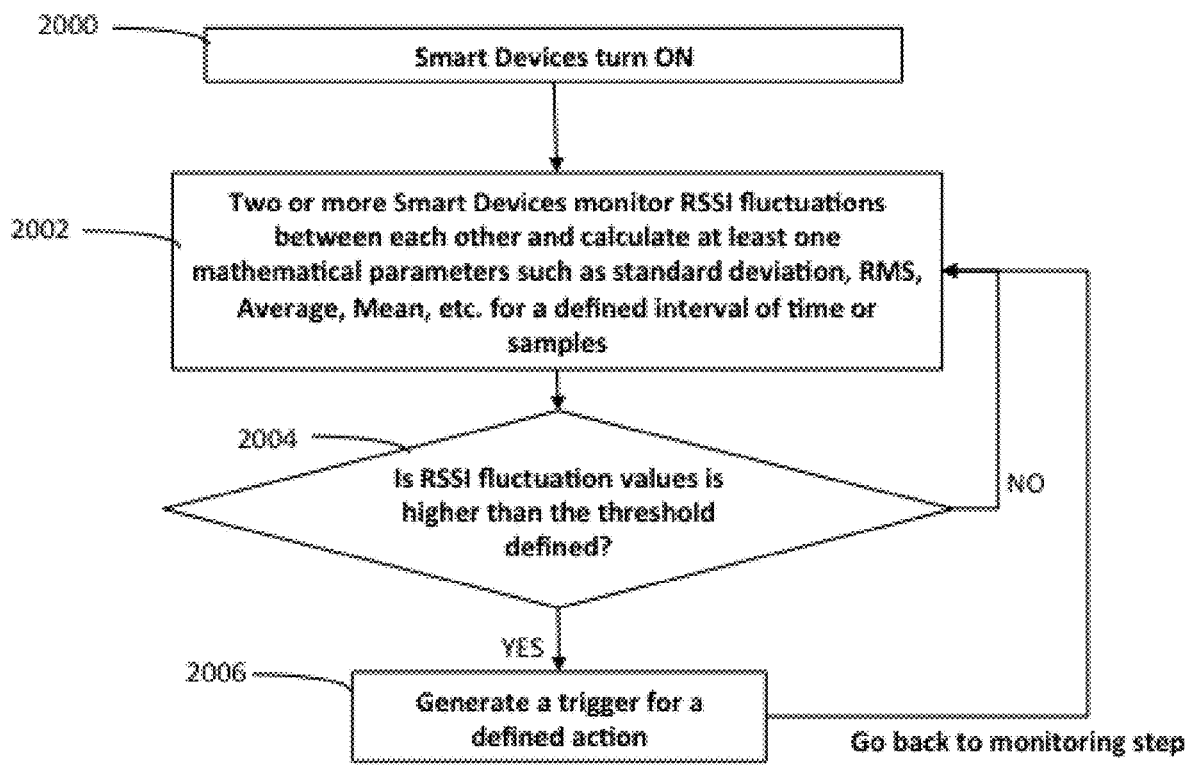
FIG. 20 is a flow chart of a process for detecting an intruder in accordance with one embodiment of the present invention.

Now referring to FIG. 20, a process for detecting a presence, motion or intruder using a network of wireless smart devices is shown. The smart devices are turned ON in block 2000. Two or more smart devices monitor RSSI or other signal strength fluctuations between each other and calculate at least one mathematical parameter, such as standard deviation, root mean square (RMS), average, mean, other such mathematical value(s), etc., for a defined interval of time or samples in block 2002. If the RSSI or other signal strength measurement fluctuation values is higher than a defined threshold value for a defined minimum time period, as determined in decision block 2004, a trigger for a defined action, such as an alarm, a message or notification is sent, an automated call is made, etc., generated in block 2006. Thereafter or if the RSSI or other signal strength measurement fluctuation values is not higher than the defined threshold value, as determined in decision block 2004, the process loops back to block 2002 to continue monitoring the RSSI or signal strength fluctuations.

Figure 21:
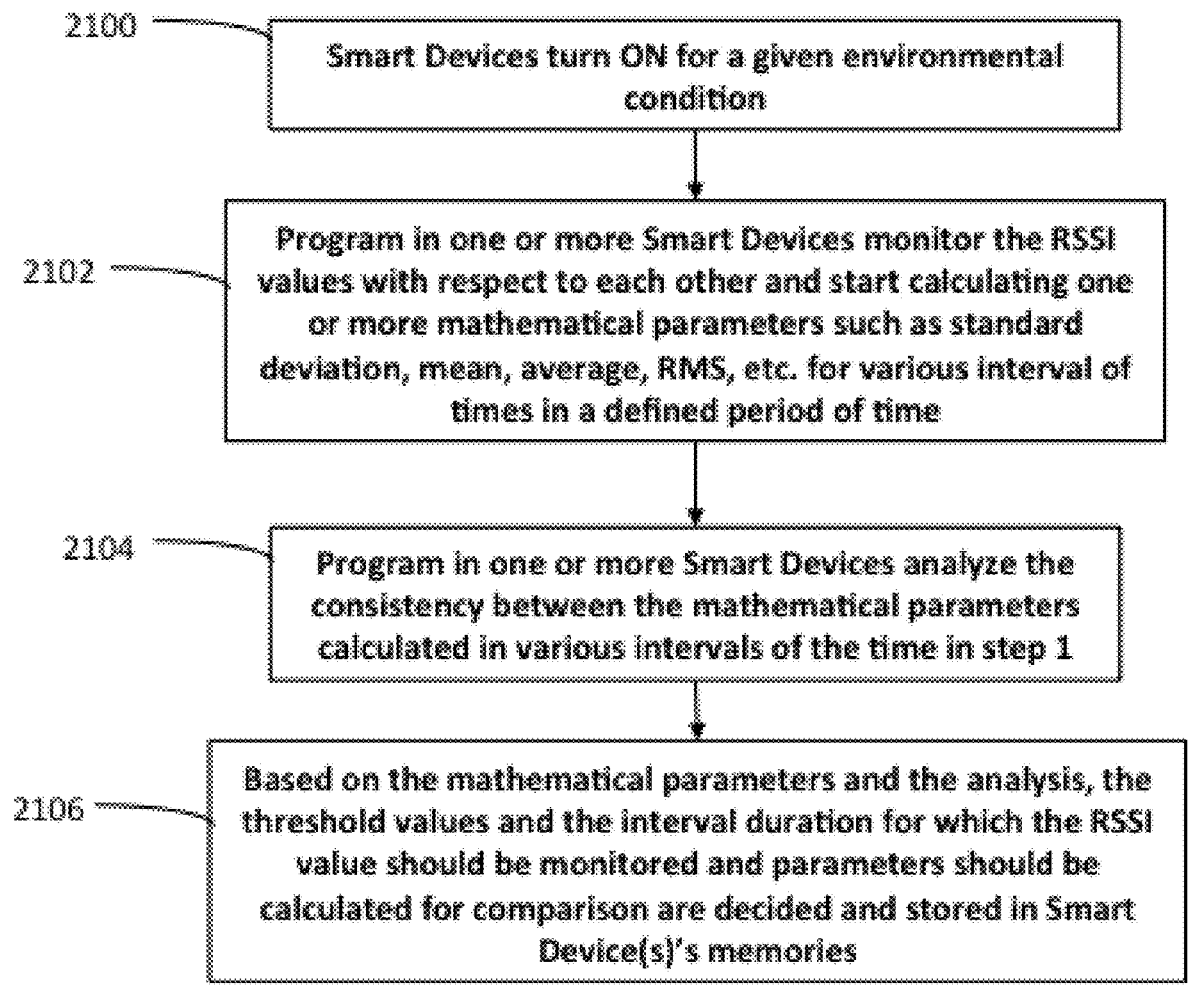
FIG. 21 is a flow chart of a process for calibrating an intruder detection process in accordance with one embodiment of the present invention.

The specified threshold and samples for calculation duration can be defined through a calibration process where smart devices when turned ON takes some time to find out threshold range of fluctuations of RSSI values and time period for which the RSSI parameters(s) such as standard deviation, average, etc. should be measured during actual monitoring to generate a trigger. The procedure to perform such a calibration is shown in FIG. 21. The smart devices are turned ON for a given environmental condition in block 2100. One or more smart devices are programmed to monitor the RSSI values with respect to each other and start calculating one or more mathematical parameters, such as standard deviation, mean, average, RMS, etc. for various interval of times in a defined period of time in block 2102. One or more smart devices are programmed to analyze the consistency between the mathematical parameters calculated in various intervals of the time in block 2104. Based on the mathematical parameters and the analysis, the threshold levels and the interval duration for which the RSSI value should be monitored and parameters should be calculated for comparison are decided and stored in the smart device(s)'s memories in block 2106. Actual RSSI value monitoring starts and parameters calculations also start. When parameters exceed the threshold values for a defined duration, the trigger is generated for a defined action.

Referring back to the FIG. 17, if an intruder is between SD1 706 and SD4 712, then the RSSI values of SD1 706 and SD2 708 with respect to each other would fluctuate beyond the threshold defined for them. However, there would be a lower fluctuation in RSSI values for SD1 706 and SD7 718. Similarly, there would be a further lower fluctuation in RSSI value for SD1 706 and SD3 710 with respect to each other. However, if the intruder is at a point equidistant from SD1 706, SD3 710, and SD4 712, then the RSSI fluctuation for SD1 706, SD3 710 and SD4 712 would be similar with respect to each other as compared to RSSI value for SD1 706 and SD7 718. With such information, the intruder can be detected at a given location more precisely.

Also the re-calibration can keep happening automatically to adjust the threshold values and the interval times or samples with an analysis of a pattern of RSSI values being measured continuously. Also, the calibration can be done by a user at the actual location or by the manufacturer or installer at other location and use empirical threshold and interval values.

Figure 22:
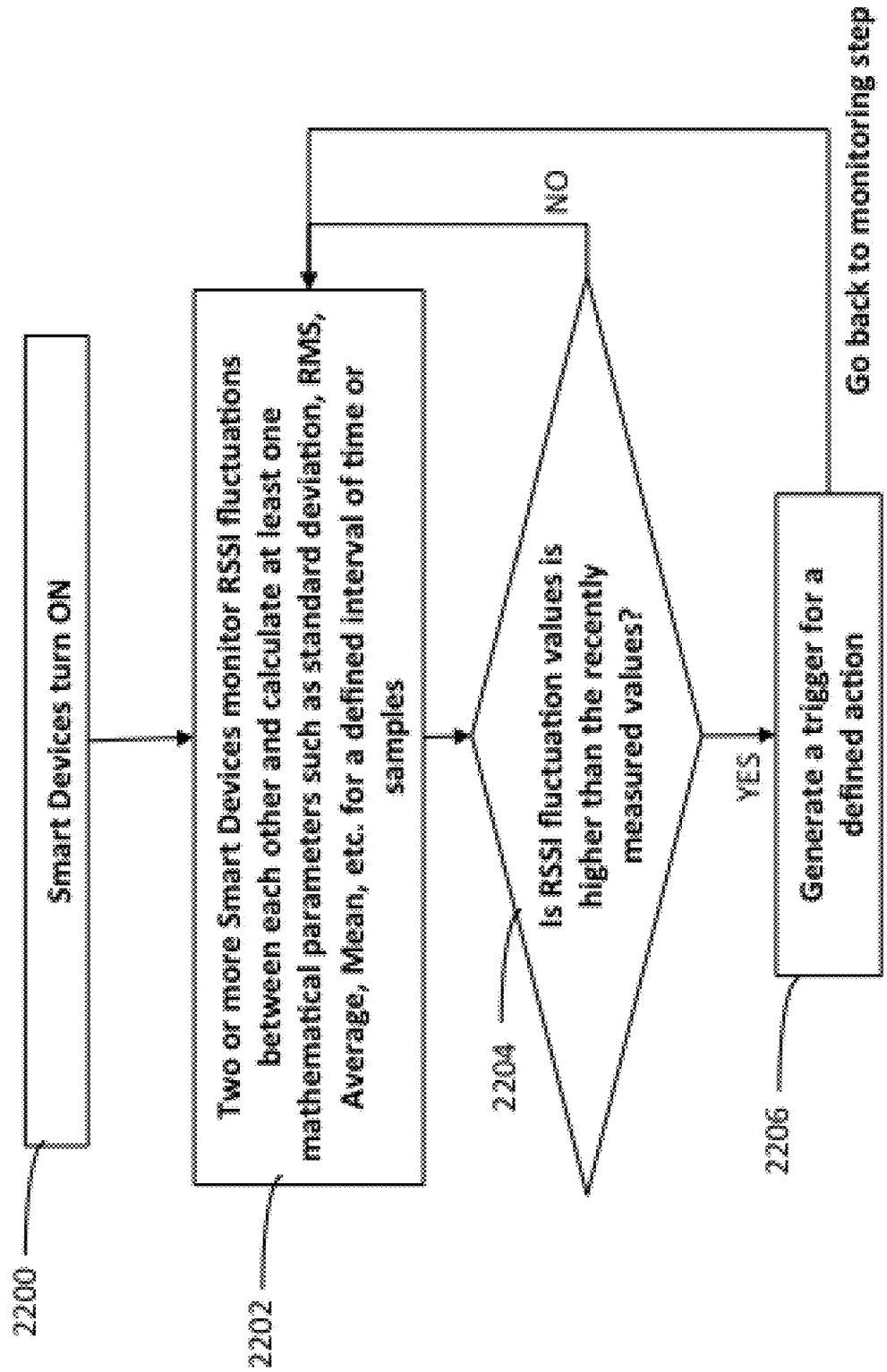
FIG. 22 is a flow chart of a process for detecting an intruder without needing calibration in accordance with one embodiment of the present invention.

Another way to find an intruder's presence without needing calibration is shown in FIGS. 21 and 22. The smart devices are turned ON for a given environmental condition in block 2100. The smart devices start measuring the signal strength parameters, such as RSSI values, and starts calculating one or more mathematical parameters, such as standard deviation, mean, average, RMS, etc., for various intervals of time within a defined time period in block 2102. The smart devices analyze the consistency between the calculated mathematical parameters in block 2104. Based on the mathematical parameters and the analysis, the threshold values and interval duration for the RSSI value should be monitored and the parameters should be calculated for comparison are decided and stored in the smart device memories in block 2106.

The smart devices are turned ON in block 2200. Two or more smart devices monitor RSSI or other signal strength fluctuations between each other and calculate at least one mathematical parameter, such as standard deviation, root mean square (RMS), average, mean, other such mathematical value(s), etc., for a defined interval of time or samples in block 2202. If the RSSI or other signal strength measurement fluctuation values is higher than the recently measured values, as determined in decision block 2204, a trigger for a defined action, such as an alarm, a message or notification is sent, an automated call is made, etc., generated in block 2206. For example, when there is a drastic change, such as 40% more in the value as compared to recently measured values, such as the previous five measured values for an example, the trigger is generated to take a predefined action. The action can also include activating wireless devices other than the wireless devices which generated a trigger to start the communication with one another. For example, if SD1 706 and SD4 714 are the only devices monitoring the RSSI values between them and generating a trigger when the fluctuation value exceeds, while other devices SD2 708, SD7 718, SD3 710, SD5 714 are idle or with wireless communication OFF or wireless communication limited with reduced signal strength or less active in terms of time duration, the trigger generated by SD1 706 or SD4 714 could be to activate the one or more of other devices SD2 708, SD7 718, SD3 710, SD5 714 to activate their communication with other devices in the vicinity. This process will help in reducing the overall power required for wireless communication of all the devices in the vicinity by having them active only when user is present. Thereafter or if the RSSI or other signal strength measurement fluctuation values is not higher than the recently measured values, as determined in decision block 2204, the process loops back to block 2202 to continue monitoring the RSSI or signal strength fluctuations. With this procedure, calibration is not required and the environmental change is automatically adjusted or filtered with such differential mathematical approach. A sensitivity value for generating the trigger can also be adjusted by the user as and when required which in turn adjusts the threshold values or percentage change as described above. In the above description, RSSI is one type of signal strength measurement unit and there could be different units or parameters that can be used for the same purpose.

For example, a movement or position of an object is detected between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is monitored as measured by the first wireless device, the second wireless device, or both. A signal strength fluctuation value for the signal strength is determined over a time period or a number of signal strength samples. A trigger for a defined action is generated whenever the signal strength fluctuation value exceeds a defined threshold. Note that the object can be a person or an animal, and the signal strength fluctuation value for the signal strength can be determined using a standard deviation, root mean square, average, mean or combination thereof. The defined threshold can be determined based on a calibration process or one or more recently measured signal strength fluctuation values. In addition, the defined action may include activating one or more other wireless devices at a location for communicating with either or both of the first and second wireless devices.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for reducing a communication signal interference between at least a first wireless lighting device and a second wireless lighting device, the method comprising:
    providing the first and second wireless lighting devices, wherein each wireless lighting device comprises a controller/processor, a wireless transceiver circuit communicably coupled to the controller/processor and an antenna communicably coupled to the wireless transceiver circuit;
    determining a communication signal strength between the first wireless lighting device and the second wireless lighting device as measured by both of the wireless lighting devices;
    determining whether the first wireless lighting device and the second wireless lighting device are within a specified range of one another;
    reducing a communication signal power of the first wireless lighting device whenever the communication signal strength measured by the first wireless lighting device exceeds a first threshold value and the second wireless lighting device is within the specified range by adjusting a gain of a communication signal amplifier within the wireless transceiver circuit of the first wireless lighting device; and
    reducing a communication signal power of the second wireless lighting device whenever the communication signal strength measured by the second wireless lighting device exceeds a second threshold value and the first wireless lighting device is within the specified range by adjusting a gain of a communication signal amplifier within the wireless transceiver circuit of the second wireless lighting devices.

2. The method as recited in claim 1, periodically repeating the determination of the communication signal strength.

3. The method as recited in claim 1, further comprising reducing the communication signal power of either or both of the wireless lighting devices to an optimized level whenever the first wireless lighting device and the second wireless lighting device are within the specified range of one another.

4. The method as recited in claim 1, further comprising reducing the communication signal power of either or both of the wireless lighting devices to a minimum level whenever the first wireless lighting device and the second wireless lighting device are outside of the specified range of one another.

5. The method as recited in claim 4, further comprising increasing the communication signal power of either or both of the wireless lighting devices to a higher level after a specified period of time has elapsed and determining whether the first wireless lighting device and the second wireless lighting device are within the specified range of one another.

6. The method as recited in claim 5, wherein the communication signal power is increased by adjusting the gain of the communication signal amplifier within the wireless transceiver circuit of either or both of the wireless lighting devices.

* * * * *